United States Patent
Matsumoto

(10) Patent No.: US 8,952,870 B2
(45) Date of Patent: Feb. 10, 2015

(54) INPUT DEVICE AND INPUT METHOD

(75) Inventor: Takashi Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 177 days.

(21) Appl. No.: 13/239,905

(22) Filed: Sep. 22, 2011

(65) Prior Publication Data

US 2012/0242594 A1 Sep. 27, 2012

(30) Foreign Application Priority Data

Mar. 22, 2011 (JP) ................................. 2011-061962
May 26, 2011 (JP) ................................. 2011-117932

(51) Int. Cl.
| | |
|---|---|
| *G06F 3/041* | (2006.01) |
| *G06F 1/16* | (2006.01) |
| *G06F 3/0488* | (2013.01) |
| *G06F 3/0484* | (2013.01) |

(52) U.S. Cl.
CPC ............ *G06F 1/1626* (2013.01); *G06F 3/0488* (2013.01); *G06F 1/1643* (2013.01); *G06F 3/0484* (2013.01)
USPC ............. 345/13; 345/156; 345/184; 345/174; 345/175; 345/104; 178/18.01; 178/20.04

(58) Field of Classification Search
USPC ................................................. 345/156–174
See application file for complete search history.

(56) References Cited

U.S. PATENT DOCUMENTS

| | | | | |
|---|---|---|---|---|
| 6,154,210 | A   * | 11/2000 | Anderson | 715/840 |
| 6,459,424 | B1 * | 10/2002 | Resman | 345/173 |
| 8,018,440 | B2 * | 9/2011 | Townsend et al. | 345/173 |
| 2006/0197750 | A1 * | 9/2006 | Kerr et al. | 345/173 |
| 2006/0238517 | A1 * | 10/2006 | King et al. | 345/173 |
| 2009/0174679 | A1 * | 7/2009 | Westerman | 345/173 |
| 2010/0056213 | A1 * | 3/2010 | Chang et al. | 455/556.2 |
| 2010/0103136 | A1 | 4/2010 | Ono et al. | |
| 2010/0134423 | A1 * | 6/2010 | Brisebois et al. | 345/173 |
| 2011/0298722 | A1 * | 12/2011 | Tse et al. | 345/173 |

FOREIGN PATENT DOCUMENTS

| | | |
|---|---|---|
| JP | 2002-318640 | 10/2002 |
| JP | 2010-108071 | 5/2010 |
| JP | 2010-182046 | 8/2010 |

* cited by examiner

*Primary Examiner* — Grant Sitta
(74) *Attorney, Agent, or Firm* — Wenderoth, Lind & Ponack, L.L.P.

(57) ABSTRACT

An input device includes a body unit, a first touch type position detection unit which detects a first touch position of a human body on a first detection surface of the body unit, a second touch type position detection unit which detects a second touch position of the human body on a second detection surface of the body unit, the second detection surface being on an opposite side of the body unit as the first detection surface, and a detection area restriction unit which restricts an area, which can be detected by the second touch type position detection unit, on the second detection surface according to information of the first touch position and information determined in advance. The information determined in advance is data indicating a relation between the first touch position on the first detection surface and the restricted area on the second detection surface.

18 Claims, 21 Drawing Sheets

THE AREA INCLUDING APPOINTED POSITIONS TO PUT THUMB FOR MEASURING

| SUBJECT NUMBER | COORDINATE OF "p" | COORDINATE OF "q" | COORDINATE OF "r" | COORDINATE OF "s" |
|---|---|---|---|---|
| No.1 | $p_1$ | $q_1$ | $r_1$ | $s_1$ |
| No.2 | $p_2$ | $q_2$ | $r_2$ | $s_2$ |
| No.3 | $p_3$ | $q_3$ | $r_3$ | $s_3$ |
| . . | . . | . . | . . | . . |
| No.100 | $p_{100}$ | $q_{100}$ | $r_{100}$ | $s_{100}$ |
| AVERAGE OF COORDINATE | $\frac{p_1+p_2+p_3+\cdots+p_{100}}{100}$ | $\frac{q_1+q_2+q_3+\cdots+q_{100}}{100}$ | $\frac{r_1+r_2+r_3+\cdots+r_{100}}{100}$ | $\frac{s_1+s_2+s_3+\cdots+s_{100}}{100}$ |

$(x_0, y_1)$

| SUBJECT NUMBER | COORDINATE OF "p" | COORDINATE OF "q" | COORDINATE OF "r" | COORDINATE OF "s" |
|---|---|---|---|---|
| No.1 | $p_1$ | $q_1$ | $r_1$ | $s_1$ |
| . . | . . | . . | . . | . . |
| No.100 | $p_{100}$ | $q_{100}$ | $r_{100}$ | $s_{100}$ |
| AVERAGE OF COORDINATE | $\frac{p_1+p_2+p_3+\cdots+p_{100}}{100}$ | $\frac{q_1+q_2+q_3+\cdots+q_{100}}{100}$ | $\frac{r_1+r_2+r_3+\cdots+r_{100}}{100}$ | $\frac{s_1+s_2+s_3+\cdots+s_{100}}{100}$ |

. . .

$(x_9, y_9)$

| SUBJECT NUMBER | COORDINATE OF "p" | COORDINATE OF "q" | COORDINATE OF "r" | COORDINATE OF "s" |
|---|---|---|---|---|
| No.1 | $p_1$ | $q_1$ | $r_1$ | $s_1$ |
| . . | . . | . . | . . | . . |
| No.100 | $p_{100}$ | $q_{100}$ | $r_{100}$ | $s_{100}$ |
| AVERAGE OF COORDINATE | $\frac{p_1+p_2+p_3+\cdots+p_{100}}{100}$ | $\frac{q_1+q_2+q_3+\cdots+q_{100}}{100}$ | $\frac{r_1+r_2+r_3+\cdots+r_{100}}{100}$ | $\frac{s_1+s_2+s_3+\cdots+s_{100}}{100}$ |

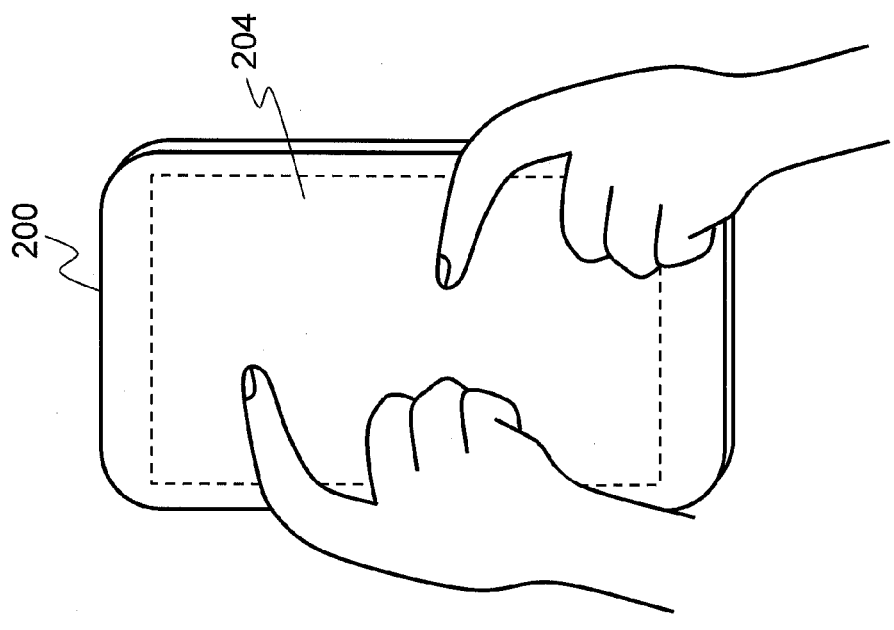
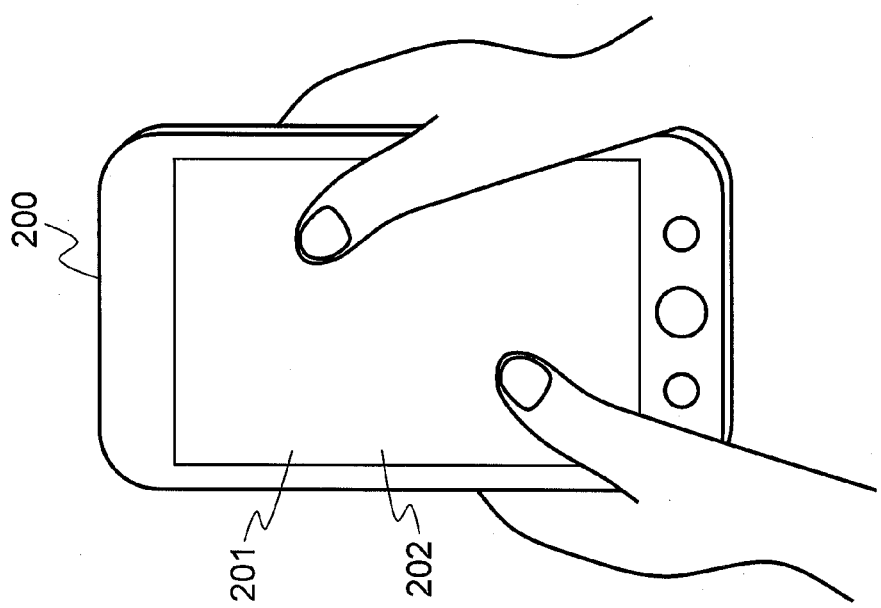

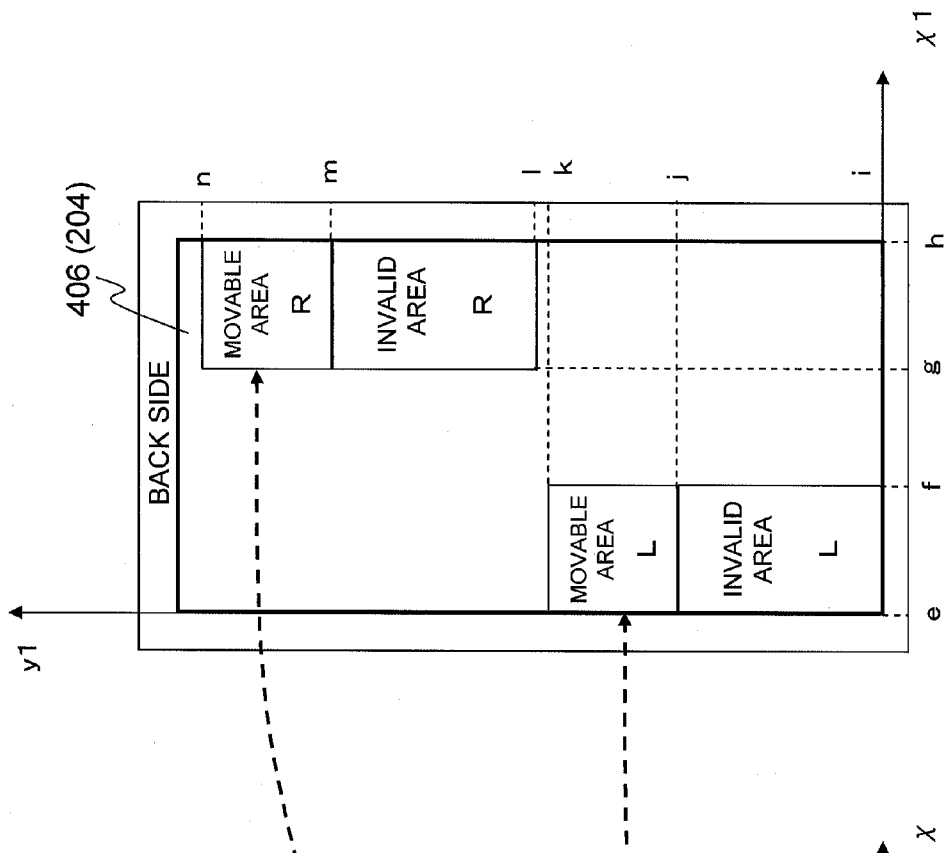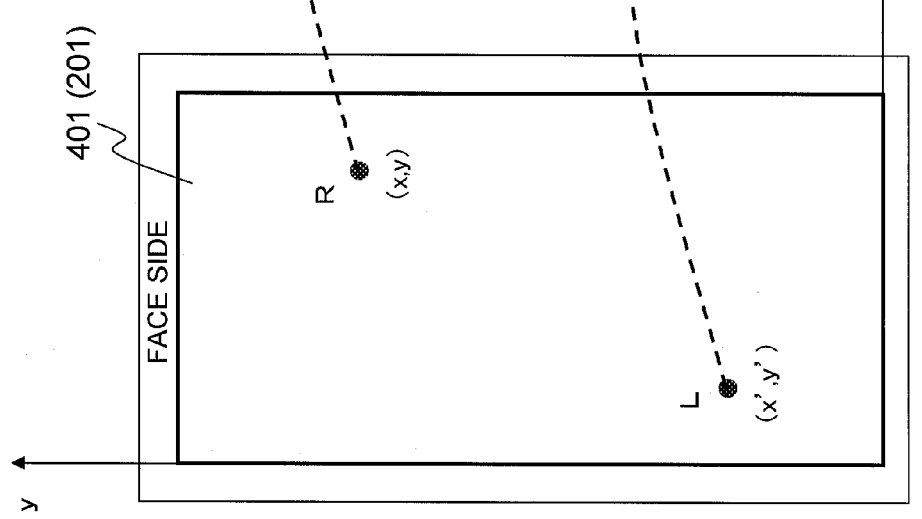
FIG.14 (A)
FIG.14 (B)

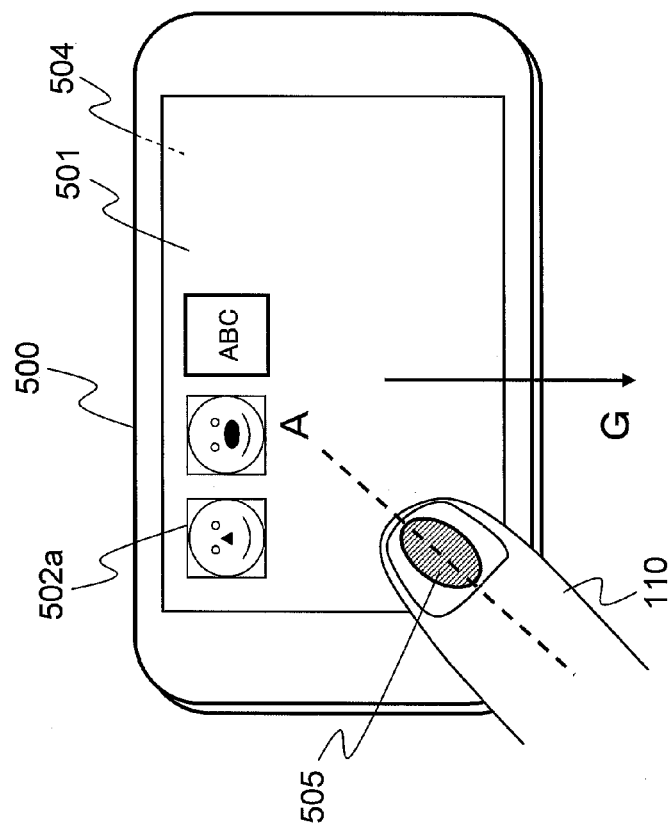
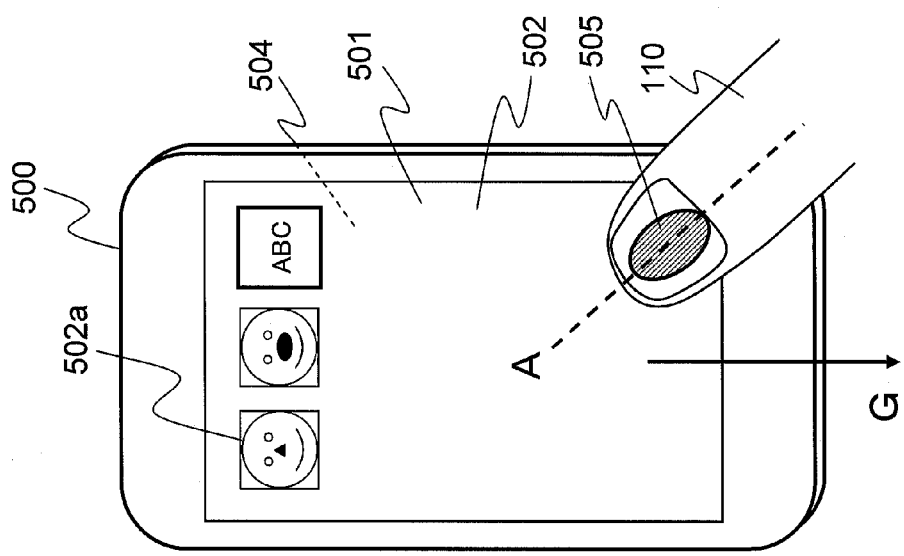
FIG.16 (A)
FIG.16 (B)

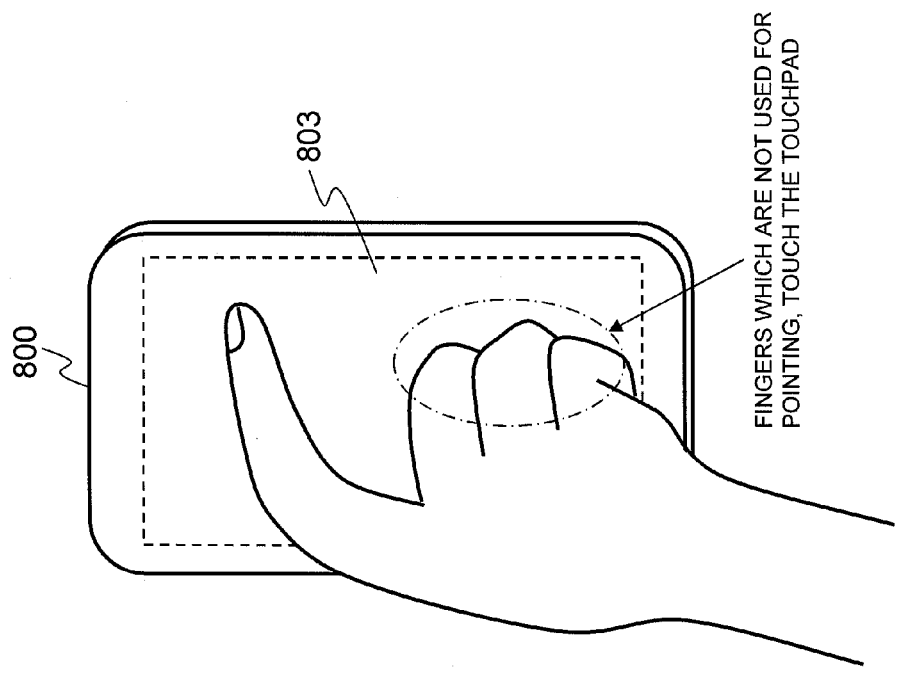
FIG.21 (B)   PRIOR ART
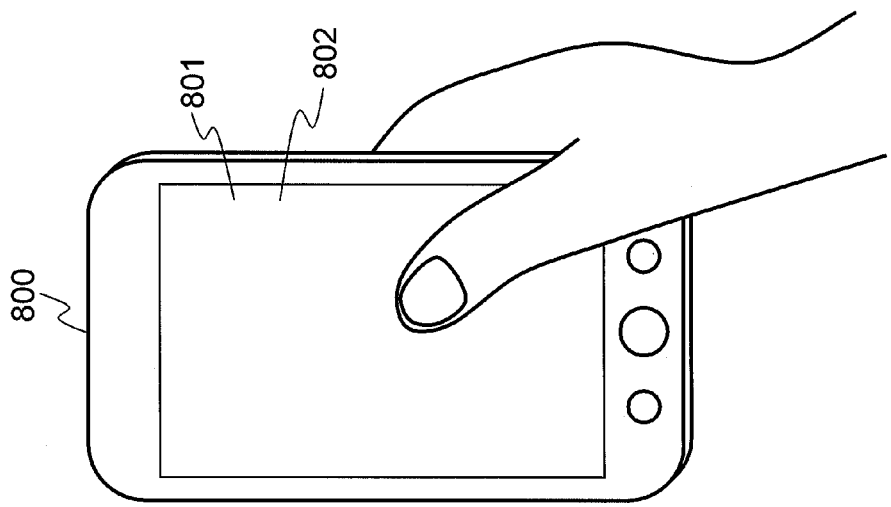
FIG.21 (A)   PRIOR ART

INPUT DEVICE AND INPUT METHOD

BACKGROUND OF THE INVENTION

1. Field of the Invention

The present invention relates to an input device having input units on face and back sides, to an input method, and so on.

2. Related Art of the Invention

Small electric equipment which has a display unit on a face (front) side of a body case and has a touchpad unit on a back side of the body case, is disclosed in Japanese Patent Laid-Open No. 2002-318640. The small electric equipment further has a mechanical operation unit at a lateral side of the body case.

When a user holds the small electric equipment with one hand, the user can input various instructions by using the operation unit of the lateral side of the body case and pointing with the touchpad unit of the back side of the body case, while watching the display unit of the face side of the body case.

On the other hand, there is a terminal not having a mechanical operation unit, or there is a terminal in which mechanical operation units are reduced as much as possible. In such terminals, a touch panel unit is often affixed on a display unit provided on the face side of the body case. Such terminals can have input units provided on both sides (the face side and the back side) of the body case.

FIG. 21(A) and FIG. 21(B) are external views of an example of the conventional terminal which has input units on both sides of the face and back. FIG. 21(A) is the external view as viewed from the face side when the terminal is held with one hand. FIG. 21(B) is the external view as viewed from the back side when the terminal is held with one hand.

A touch panel unit 801 is provided on the face side of the body case of the terminal 800. A touchpad unit 803 is provided on the back side of the body case. The touch panel unit 801 is affixed on a display unit 802 provided on the face of the body case.

When the user holds such the terminal 800, for example, the user can input various instructions by using with the user's thumb the touch panel unit 801 provided on the face side of the body case and pointing with the user's forefinger by the touchpad unit 803 provided on the back side of the body case, while watching the display unit 802 provided on the face side of the body case.

SUMMARY OF THE INVENTION

However, the following problem occurs with the conventional terminal which has the input units on the face and back sides of the body case.

When such the terminal is held with one hand, it can happen that a middle finger, a third finger and a little finger which should not be used for pointing, touch the touchpad unit 803 arranged on the back side of the body case as illustrated in FIG. 21(B). For example, the middle finger, the third finger and the little finger touch the area of the touchpad unit 803 which is surrounded in dash lines in FIG. 21(B). If those fingers which should not be used for pointing touch, it is judged that a pointing was done at the touched position of those fingers. Therefore, a problem occurs that a pointing with the forefinger can't be done as intended.

The present invention intends to offer, in consideration of the conventional problems described above, such an input device and an input method that, input operation on an input unit arranged on the back side can be executed more correctly.

The $1^{st}$ aspect of the present invention is an input device comprising:

a body unit;

a first touch type position detection unit which detects a first touch position of a human body on a first detection surface of the body unit;

a second touch type position detection unit which detects a second touch position of the human body on a second detection surface of the body unit, the second detection surface being on an opposite side of the body unit as the first detection surface; and a detection area restriction unit which restricts an area which can be detected by the second touch type position detection unit, on the second detection surface according to information of the first touch position and information determined in advance, wherein the information determined in advance is data indicating a relation between the first touch position on the first detection surface and the restricted area on the second detection surface.

The $2^{nd}$ aspect of the present invention is the input device according to the $1^{st}$ aspect of the present invention, wherein the information determined in advance is an average value of data of a large number of people, each data of the people being a relation between an operation area and a certain position where the operation area is acquired based on a touch position of a forefinger or a middle finger on the second detection surface when a thumb is touched on at least one position of the first detection surface in a case that the body unit is held with the thumb and the forefinger or the middle finger of same hand, and the certain position is the one position of the first detection surface.

The $3^{rd}$ aspect of the present invention is the input device according to the $1^{st}$ aspect of the present invention, wherein the detection area restriction unit restricts in a manner that the restriction area on the second detection surface cannot be detected by the second touch type position detection unit.

The $4^{th}$ aspect of the present invention is the input device according to the $1^{st}$ aspect of the present invention, wherein the first touch type position detection unit detects two of the first touch positions on the first detection surface at the same time, and the detection area restriction unit determines, based on one of the first touch positions, a first undetectable area on the second detection surface, and the detection area restriction unit determines, based on another of the first touch positions, a second undetectable area on the second detection surface, and the detection area restriction unit restricts in a manner that an area included in at least one area of the first undetectable area and the second undetectable area, cannot be detected by the second touch type position detection unit.

The $5^{th}$ aspect of the present invention is the input device according to the $1^{st}$ aspect of the present invention, further comprising an acceleration sensor, wherein the first touch type position detection unit detects a touch area of the human body on the first detection surface and determines the first touch position based on the detected touch area, the information determined in advance includes a plurality of pieces of information determined in advance depending on a direction in which the body unit is held, and the detection area restriction unit selects one of the pieces of information determined in advance based on the holding direction of the body unit determined by a direction of the touch area detected by the first touch type position detection unit and a direction of gravity detected by the acceleration sensor, and the detection area restriction unit restricts an area which can be detected by the second touch type position detection unit on the second detection surface according to the selected piece of information determined in advance.

The 6$^{th}$ aspect of the present invention is the input device according to the 1$^{st}$ aspect of the present invention, further comprising:

a display unit; and a display control unit which controls the display unit, wherein the first touch type position detection unit detects a touch area of the human body on the first detection surface and determines the first touch position based on the detected touch area, the first touch type position detection unit detects two of the touch areas on the first detection surface, and the display control unit changes a direction of screen components displayed on the display unit based on each of a direction of the two touch areas detected by the first touch type position detection unit.

The 7$^{th}$ aspect of the present invention is an input method comprising:

a detection step of detecting a first touch position of a human body on a first detection surface of a body unit; and a detection area restriction step of restricting an area which can be detected a second touch position of the human body on a second detection surface of the body unit, according to information of the first touch position and information determined in advance, wherein the second detection surface is on an opposite side of the body unit as the first detection surface, and the information determined in advance is data indicating a relation between the first touch position on the first detection surface and the restricted area on the second detection surface.

The 8$^{th}$ aspect of the present invention is a non-transitory computer-readable medium having a program stored thereon for causing a computer to execute the input method according to the 7$^{th}$ aspect of the present invention.

The present invention can provide such an input device and an input method that input operation on the input unit arranged on the back side can be executed more correctly.

BRIEF DESCRIPTION OF THE DRAWINGS

FIG. 7 is an illustration to explain how the average value of the movable area of the forefinger according to each position of the thumb, according to the first embodiment of the present invention;

FIG. 10(A) is a schematic external view for illustrating a handheld terminal that is held with both hands, as viewed from the face side, according to a second embodiment of the present invention;

FIG. 10(B) is a schematic external view for illustrating the handheld terminal that is held with both hands, as viewed from the back side, according to the second embodiment of the present invention;

FIG. 14(A) is an illustration which shows the position coordinate of the thumb detected by a face side input unit in the handheld terminal according to the second embodiment of the present invention;

FIG. 14(B) is an illustration to explain an invalid area of a back side input unit in the handheld terminal according to the second embodiment of the present invention;

FIG. 16(A) is an illustration which shows a scene of a handheld terminal held lengthwise with a right hand, according to a third embodiment of the present invention;

FIG. 16(B) is an illustration which shows a scene of the handheld terminal held crosswise with a left hand, according to the third embodiment of the present invention;

FIG. 21(A) is a schematic external view as viewed from a face side of a conventional terminal which has input units on the face side and a back side, and is held with one hand; and FIG. 21(B) is a schematic external view as viewed from a back side of the conventional terminal which has input units on the face side and the back side, and is held with one hand.

DESCRIPTION OF SYMBOLS

Figure 1:
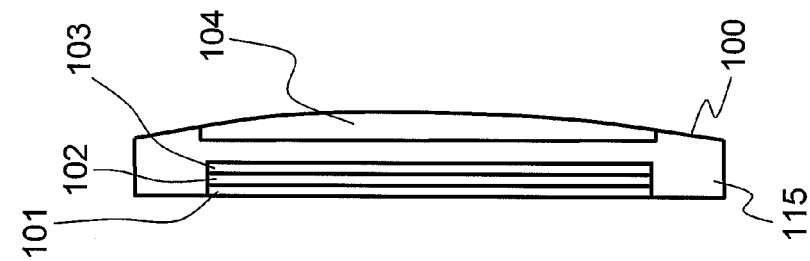
FIG. 1(A) is a schematic external view for illustrating a face side of a handheld terminal according to a first embodiment of the present invention.
FIG. 1(B) is a schematic external view for illustrating a back side of the handheld terminal according to the first embodiment of the present invention.
FIG. 1(C) is a schematic sectional view for illustrating a lateral side of the handheld terminal according to the first embodiment of the present invention.
Figure 1:
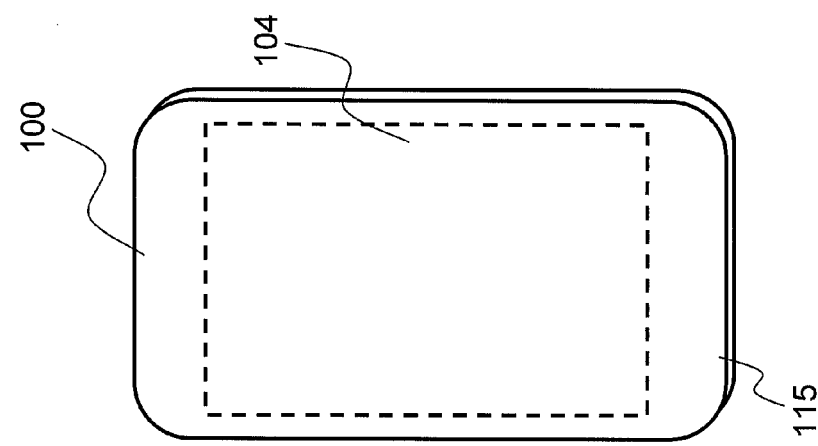
Figure 1:
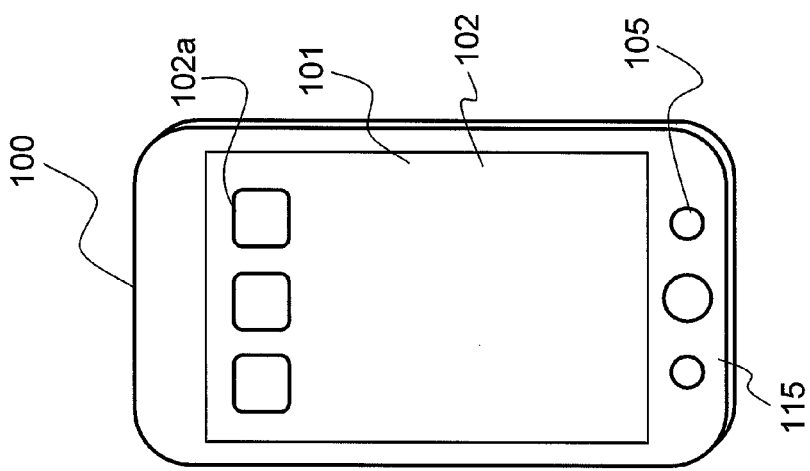

100 Handheld terminal
101 Touch panel
102 Liquid crystal display
102a Icon
103 Backlight
104 Touchpad
105 Operating button
110 Thumb
111 Forefinger
112 Middle finger
113 Third finger
114 Little finger
115 Frame
120 Contact surface
121 Extent of the x direction where the contact is detected
122 Extent of the y direction where the contact is detected
123 Estimated movable area of the forefinger
124, 126 Estimated movable area of the forefinger
125, 127 Invalid area
130, 131 Detected voltage waveform
200 Handheld terminal
201 Touch panel
202 Liquid crystal display
204 Touchpad
230, 231 Capacitance distribution
232 Overlap area of invalid area and valid area
301 Face side input unit
302 Input position analysis unit
303 Movable area estimate unit
304 Table
305 Invalid area determination unit
306 Back side input unit
307 Input position analysis unit
308 Valid area restriction unit
309 Input information processing unit
310 Display control unit
311 Display unit
312 Input position analysis unit
313 Movable area estimate unit
314 Table
315 Acceleration sensor
319 Input information processing unit
401 Face side input unit
402 Input position analysis unit
403 Movable area estimate unit
404 Table
405 Invalid area determination unit
406 Back side input unit
407 Input position analysis unit
408 Valid area restriction unit
409 Input information processing unit
410 Display control unit
411 Display unit
412 Input position analysis unit
413 Movable area estimate unit
419 Input information processing unit
500 Handheld terminal
501 Touch panel
502 Liquid crystal display
502a Icon
504 Touchpad
505 Detection area
600 Handheld terminal
601 Touch panel
602 Liquid crystal display
602a Icon
604 Touchpad
605, 606 Detection area
700 Handheld terminal
701 Touch panel
702 Liquid crystal display
800 Terminal
801 Touch panel unit
802 Display unit
803 Touchpad unit

PREFERRED EMBODIMENTS OF THE INVENTION

Hereinafter, embodiments of the present invention are described in detail with reference to the drawings.

First Embodiment

In a first embodiment of the present invention, such an embodiment is described that a handheld terminal such as a smartphone which has a size that can be operated with one hand, is operated with one hand (a right hand in this example).

External views of the handheld terminal of the first embodiment are shown in FIG. 1(A) to FIG. 1(C). FIG. 1(A) shows a face side of the handheld terminal, FIG. 1(B) shows a back side of the handheld terminal, and FIG. 1(C) shows a sectional view of a lateral side of the handheld terminal.

As shown in FIG. 1(A), FIG. 1(B) and FIG. 1(C), the handheld terminal 100 of the first embodiment is flat-shaped. A symbol 115 in the figures is a frame. As shown in FIG. 1(A), a liquid crystal display 102 occupies most of the face side of the handheld terminal 100. As shown in FIG. 1(C), the touch panel 101 is affixed on a front face of the liquid crystal display 102. For example, the touch panel 101 is a resistive-type touch panel. Consequently, a display on the liquid crystal display 102 can be watched through a metal thin film composing a transparent electrode.

Icons 102a for starting an application, or the like are displayed on the liquid crystal display 102. A user can choose one of the icons 102a displayed on the liquid crystal display 102, by using the touch panel 101.

A plurality of operating buttons 105 are arranged at the lower part of the handheld terminal 100. The user can start the application indicated by the chosen icon 102a and change display of the liquid crystal display 102, by operating the operating buttons 105.

The operating button 105 does not need to be an independent operation button different from the liquid crystal display 102 because the touch panel 101 is affixed to the liquid crystal display 102. For example, the operation buttons are displayed on the liquid crystal display 102 and the operation button displayed on the liquid crystal display 102 can be operated by pushing the touch panel 101.

As shown in FIG. 1(B), a touchpad 104 occupies most of the back side of the handheld terminal 100. For example, the touchpad 104 is a capacitive-type touchpad. As mentioned above, the handheld terminal 100 of the first embodiment has input units on the face side and back side.

As shown in FIG. 1(C), the touch panel 101, the liquid crystal display 102, a backlight 103, and the touchpad 104 are arranged sequentially from the face side in the lateral section of the handheld terminal 100. Furthermore, a circuit board mounted with electronic parts, a battery driving the handheld terminal 100 or the like are arranged in the handheld terminal 100, but these elements are omitted in FIG. 1(C).

The frame 115, the touch panel 101, the liquid crystal display 102, the backlight 103, the touchpad 104, the operating buttons 105 and so on correspond to an example of a body unit according to the present invention. The touch panel 101 corresponds to an example of a first touch type position detection unit according to the present invention. A surface for touch of the touch panel 101 on the face side of the handheld terminal 100 corresponds to an example of a first detection surface according to the present invention. A position where a thumb of the user touches the touch panel 101 corresponds to an example of a first touch position according to the present invention. The touchpad 104 corresponds to an example of a second touch type position detection unit according to the present invention. A surface for touch of the touchpad 104 on the back side of the handheld terminal 100 corresponds to an example of a second detection surface according to the present invention. A position where a finger for pointing such as a forefinger of the user, touches the touchpad 104 corresponds to an example of a second touch position according to the present invention.

Figure 2:
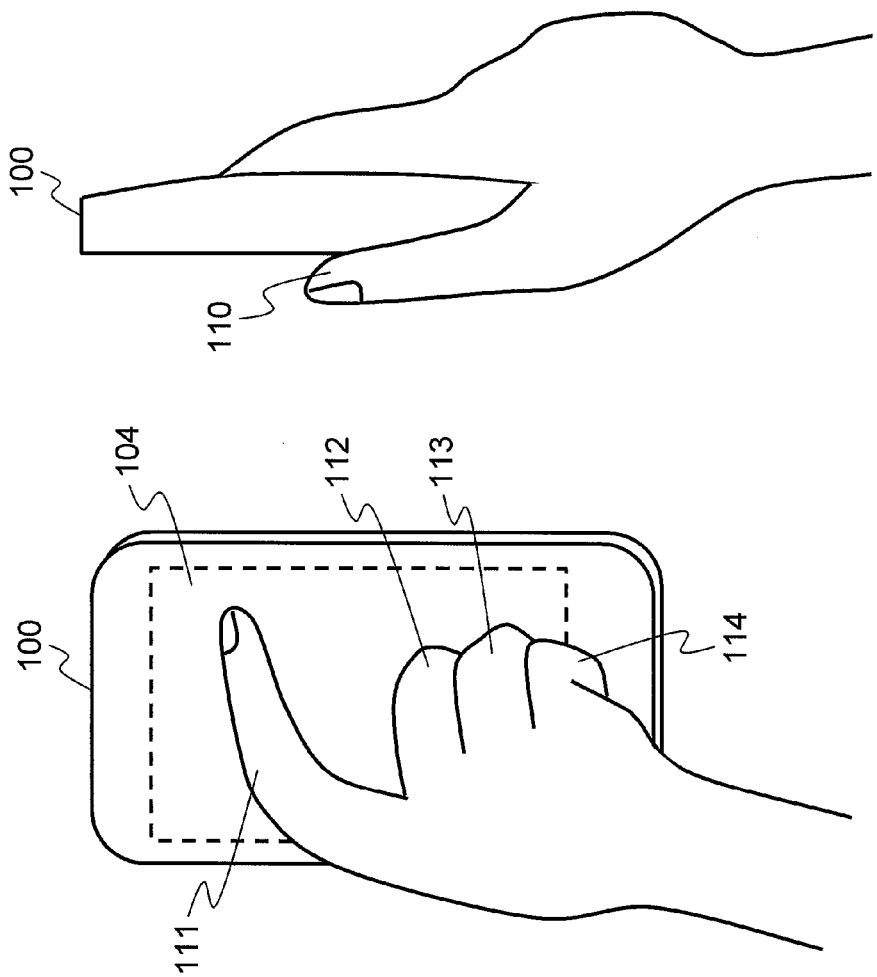
FIG. 2(A) is a schematic external view as viewed from a face side of the handheld terminal that is held with one hand, according to the first embodiment of the present invention.
FIG. 2(B) is a schematic external view as viewed from a back side of the handheld terminal that is held with one hand, according to the first embodiment of the present invention.
FIG. 2(C) is a schematic external view as viewed from a lateral side of the handheld terminal that is held with one hand, according to the first embodiment of the present invention.

External views of the handheld terminal 100 of the first embodiment which is held with one hand, are shown in FIG. 2(A) to FIG. 2(C). FIG. 2(A) to FIG. 2(C) are external views of the handheld terminal 100 which is held with the right hand. FIG. 2(A), FIG. 2(B) and FIG. 2(C) correspond to FIG. 1(A), FIG. 1(B) and FIG. 1(C) with regard to direction, respectively.

As shown in FIG. 2(A), the touch panel 101 arranged on the face side of the handheld terminal 100 is operated by the thumb 110 of the user.

On the other hand, as shown in FIG. 2(B), the touchpad 104 arranged on the back side of the handheld terminal 100 is operated by the forefinger 111 of the user. At that time, the middle finger 112, the third finger 113 and the little finger 114 of the user come in contact with the touchpad 104 arranged on the back side of the handheld terminal 100. Therefore, the pointing by the forefinger 111 may not be done as intended. However, as shown in FIG. 2(B) and FIG. 2(C), the user should place his middle finger 112, third finger 113 and little finger 114 on the touchpad 104 for holding the handheld terminal 100 steady.

The handheld terminal 100 of the first embodiment solves such a problem that the pointing by the forefinger 111 may not be done as intended.

Figure 3:
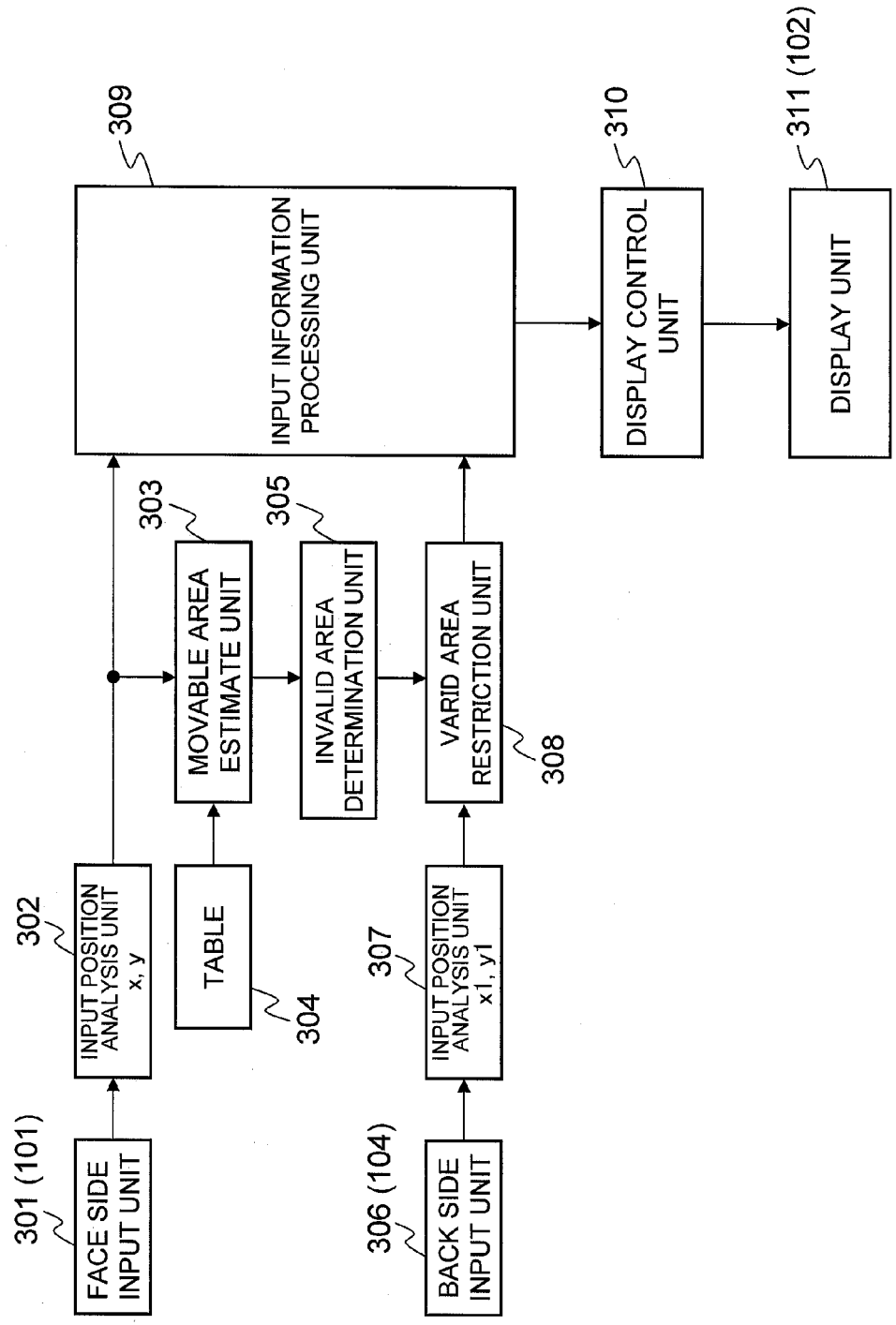
FIG. 3 is a block diagram of the handheld terminal according to the first embodiment of the present invention.

A block diagram of the handheld terminal 100 of the first embodiment is shown in FIG. 3.

A face side input unit 301 in FIG. 3 corresponds to the touch panel 101 in FIG. 1(A). A back side input unit 306 in FIG. 3 corresponds to the touchpad 104 in FIG. 1(B). A display unit 311 in FIG. 3 corresponds to the liquid crystal display 102 in FIG. 1(A).

Output of the face side input unit 301 is inputted to an input position analysis unit 302. The input position analysis unit 302 outputs a position coordinate (x, y) of the thumb 110 on the face side input unit 301.

Output of the back side input unit 306 is inputted to an input position analysis unit 307. The input position analysis unit 307 outputs a position coordinate (x1, y1) of the position where the finger of the user touches the back side input unit 306. At that time, there is such possibility that the middle finger 112, the third finger 113 and the little finger 114 of the user may come in contact with the back side input unit 306 in addition to the forefinger 111 of the user.

A movable area estimate unit 303 refers to a table 304 and estimates a movable area of the forefinger 111 of the user on the back side input unit 306 according to the output of the input position analysis unit 302. Therefore, information about the movable area of the forefinger 111 which corresponds to a position of the thumb 110 of the user when the user holds the handheld terminal 100 with one hand, is recorded in the table 304 in advance. That is, such information is recorded indicating a relation between the position of the thumb 110 of the user on the face side input unit 301 and the movable area of the forefinger 111 on the back side input unit 306 under where the thumb 110 is at the said position, when the user holds the handheld terminal 100 with one hand.

An invalid area determination unit 305 determines an invalid area on the back side input unit 306 according to the output of the movable area estimate unit 303. That is, for example an area below the estimated movable area of the forefinger 111 of the user on the back side input unit 306 is determined as the invalid area.

The information recorded in the table 304 corresponds to an example of information determined in advance according to the present invention. The invalid area determination unit 305 corresponds to a detection area restriction unit according to the present invention. The invalid area on the back side input unit 306 corresponds to a restricted area according to the present invention.

A valid area restriction unit 308 judges whether the position coordinate (x1, y1), which is outputted by the input position analysis unit 307, of the position where the finger of the user touches the back side input unit 306, is included in the invalid area outputted by the invalid area determination unit 305.

When the position coordinate (x1, y1), which is outputted by the input position analysis unit 307, of the position where the finger of the user touches the back side input unit 306, is included in the invalid area outputted by the invalid area determination unit 305, the valid area restriction unit 308 doesn't output the position coordinate (x1, y1) to an input information processing unit 309. In this case, the position coordinate (x1, y1) where touch is detected is more likely to be a position coordinate outputted as a result that the middle finger 112, the third finger 113 or the little finger 114 of the user touches the back side input unit 306. Therefore, the valid area restriction unit 308 doesn't output this position coordinate (x1, y1) to the input information processing unit 309.

On the other hand, when the position coordinate (x1, y1), which is outputted by the input position analysis unit 307, of the position where the finger of the user touches the back side input unit 306, is not included in the invalid area outputted by the invalid area determination unit 305, the valid area restriction unit 308 outputs this position coordinate (x1, y1) to the input information processing unit 309. In this case, the position coordinate (x1, y1) where touch is detected is more likely to be a position coordinate outputted as a result that the forefinger 111 of the user touches the back side input unit 306. Therefore, the valid area restriction unit 308 outputs this position coordinate (x1, y1) to the input information processing unit 309.

In this way, the problem that a pointing with the forefinger 111 cannot be done as intended because the middle finger 112, the third finger 113 or the little finger 114 touches the back side input unit 306, can be reduced.

In the above, at the handheld terminal 100 of the first embodiment, it is described that the valid area restriction unit 308 judges whether the position coordinate (x1, y1) which is outputted by the input position analysis unit 307, is included in the invalid area.

However in the first place, it may be that the back side input unit 306 cannot be operated at the invalid area on the back side input unit 306. That is, the valid area restriction unit 308 can control the back side input unit 306 not to scan to detect a touch in the invalid area on the back side input unit 306.

In this way, areas that the back side input unit 306 must scan to detect touch, is limited. Then, consumption electricity of the back side input unit 306 can be reduced. Furthermore, the valid area restriction unit 308 does not need to judge whether the position coordinate (x1, y1) outputted by the input position analysis unit 307, is included in the invalid area one by one. Then, processing load of the valid area restriction unit 308 can be reduced.

The input information processing unit 309 gets a position coordinate (x, y), which is outputted by the output of the input position analysis unit 302, of the thumb 110 of the user and a position coordinate (x1, y1), which is outputted by the valid area restriction unit 308, of the forefinger 111 of the user in this way. The input information processing unit 309 outputs, to a display control unit 310, the position coordinate (x, y) of the thumb 110 of the user and the position coordinate (x1, y1) of the forefinger 111 of the user.

The display control unit 310 controls the display unit 311 appropriately according to the position coordinate (x, y) of the thumb 110 and the position coordinate (x1, y1) of the forefinger 111 of the user which are outputted by the input information processing unit 309.

Therefore, if the user chooses one of icons 102a displayed on the display unit 311 by the thumb 110 and taps the back side input unit 306 by the forefinger 111, the user can start an application indicated by the chosen icon 102a.

Figure 4:
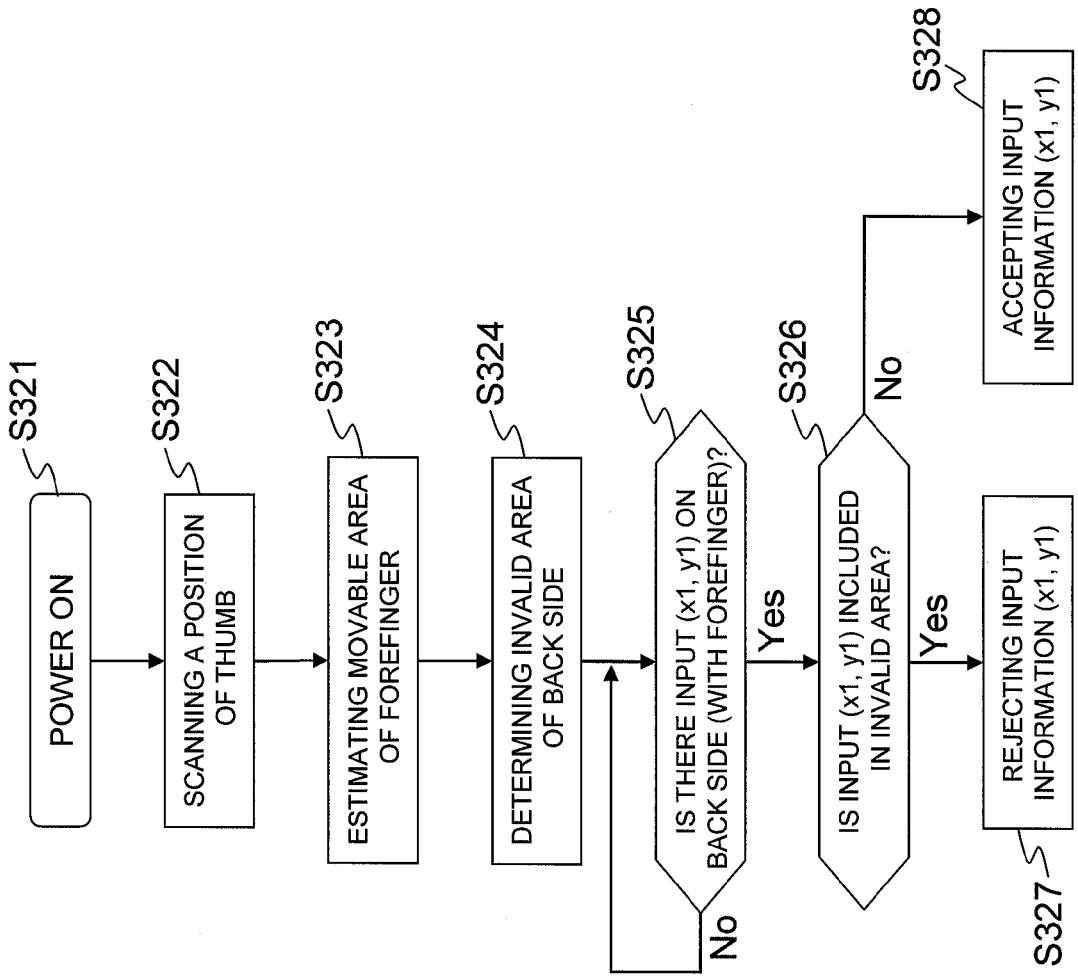
FIG. 4 is a flow chart for illustrating operations of the handheld terminal according to the first embodiment of the present invention.

A flow chart for operations of the handheld terminal of the first embodiment is shown in FIG. 4.

The operations of the handheld terminal of the first embodiment are described with reference to FIG. 3 in accordance with the flow chart of FIG. 4.

At step S321, the user operates a power switch (not illustrated) and switches on the handheld terminal 100.

At step S322, the input position analysis unit 302 determines the position coordinate (x, y) of the thumb 110 of the user according to the output of the face side input unit 301.

Figure 5:
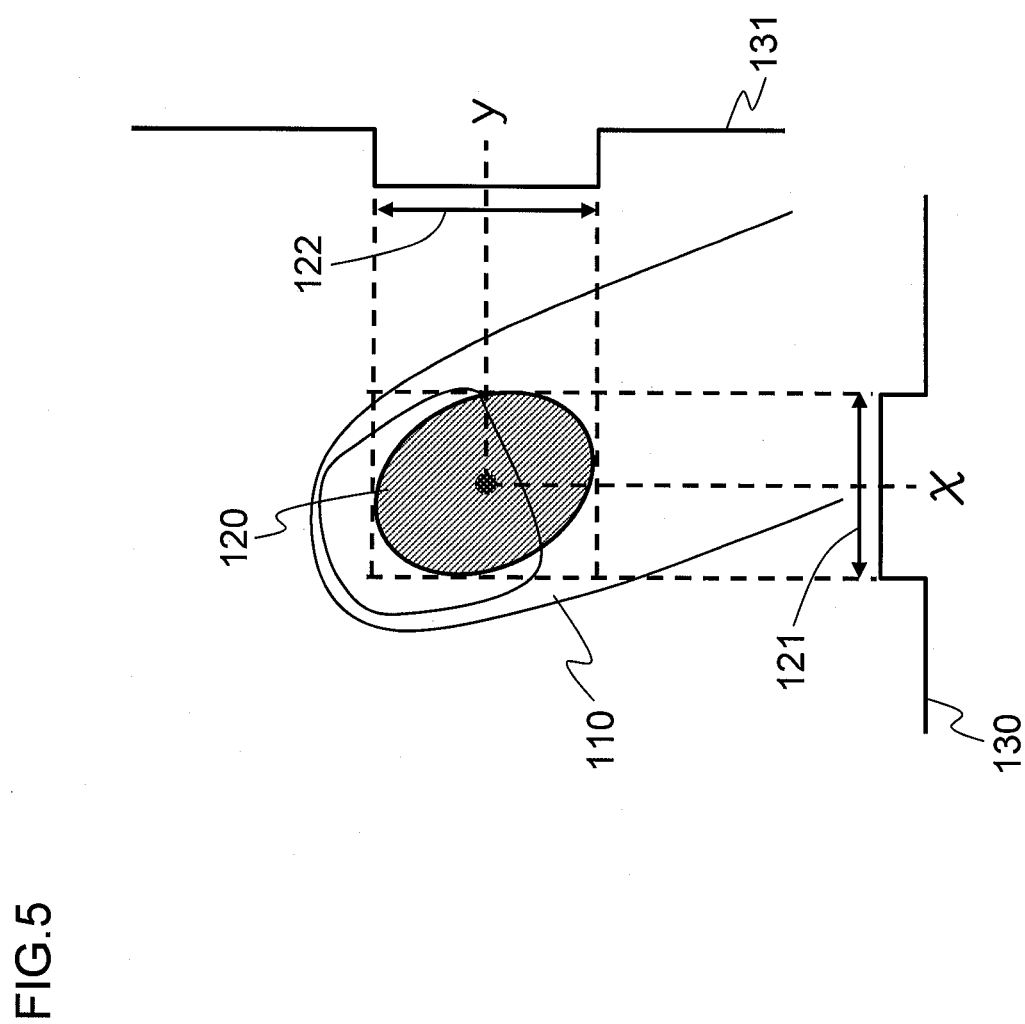
FIG. 5 is an illustration of an image to explain how a position coordinate of a thumb of a user is determined in the handheld terminal according to the first embodiment of the present invention.

FIG. 5 is an image illustration to explain how the input position analysis unit 302 determines the position coordinate (x, y) of the thumb 110 of the user.

The thumb 110 of the user touches the face side input unit 301. The resistive-type touch panel 101 can specify the touch position of x direction and y direction on the touch panel 101 by measuring voltages of the transparent electrode.

The contact surface 120 that the thumb 110 of the user touches the face side input unit 301, is the area filled with oblique lines in FIG. 5, and the shape of the contact surface 120 is the abbreviation oval as shown in FIG. 5. In FIG. 5, each of symbol 130 and symbol 131 shows a waveform of the voltage detected in x direction and y direction. Then, a contact is detected in a certain extent 121 and in a certain extent 122 for each of x direction and y direction on the touch panel 101. For example, the input position analysis unit 302 assumes that a middle point of the extent 121 of the x direction where the contact is detected, is the x coordinate of the position of the thumb 110 of the user. Similarly, the input position analysis unit 302 assumes that a middle point of the extent 122 of the y direction where the contact is detected, is the y coordinate of the position of the thumb 110 of the user.

The above is one of the simplest methods for the input position analysis unit 302 to determine the position coordinate (x, y) of the thumb 110 of the user. But the input position analysis unit 302 can use any kind of method to determine the position coordinate (x, y) of the thumb 110 of the user.

The process of the step S322 described above corresponds to an example of a detection step of detecting a first touch position according to the present invention.

At step S323, the movable area estimate unit 303 refers to the table 304 and estimates the movable area of the forefinger 111 of the user placed on the back side input unit 306 according to the position coordinate (x, y) of the thumb 110 of the user, determined by the input position analysis unit 302.

FIG. 8(A) and FIG. 8(B) are image illustrations to explain how the movable area estimate unit 303 estimates the movable area of the forefinger 111 of the user. FIG. 8(A) shows a part of the table 304. FIG. 8(B) is the illustration as viewed from the face side of the handheld terminal 100 and FIG. 8(B) shows the correspondence between the face side input unit 301 and the back side input unit 306.

The movable area estimate unit 303 refers to the table 304 according to the position coordinate (x, y) of the thumb 110 of the user. The lateral direction of the table 304 shows the x coordinate of the position coordinate of the thumb 110 of the user. The lengthwise direction of the table 304 shows the y coordinate of the position coordinate of the thumb 110 of the user. The main section of the table 304 shows the movable area of the forefinger 111 of the user on the back side input unit 306 for each position coordinate (x, y) of the thumb 110 of the user.

For example, as shown in FIG. 8(A), "a<=x1<=b" and "c<=y1<=d" are recorded in the table 304 as the movable area of the forefinger 111 of the user for the position coordinate (x, y) of the thumb 110 of the user. Then, in this case, the movable area of the forefinger 111 of the user on the back side input unit 306 is estimated at "a<=x1<=b" and "c<=y1<=d". Here, (x, y) shows a coordinate system on the face side input unit 301 and (x1, y1) shows a coordinate system on the back side input unit 306. These coordinate systems can be the coordinate systems that use the common origin but can be the coordinate systems that use the different origins.

In an example of FIG. 8(B), the coordinate "a" of the x direction exists along the way of the right and left direction of the back side input unit 306. The coordinate "b" of the x direction exists at the left edge of the back side input unit 306. The right and left direction of the back side input unit 306 is contrary to the right and left direction of the face side, because FIG. 8(B) is the illustration as viewed from the face side of the handheld terminal 100 of the first embodiment.

The coordinate "c" of the y direction exists along the way of the top and bottom direction of the back side input unit 306. The coordinate "d" of the y direction exists at the top edge of the back side input unit 306.

Therefore, the estimated movable area 123, which is estimated by the movable area estimate unit 303 by using the table 304 shown in FIG. 8(A), of the forefinger 111 of the user, is the left area from the coordinate "a" of the x direction of the back side input unit 306 and is the upper area from the coordinate "c" of the y direction. The part of the estimated movable area 123 is indicated by a hatching in FIG. 8(B).

At step S324, the invalid area determination unit 305 determines the invalid area on the back side input unit 306 according to the estimated movable area 123 of the forefinger 111 of the user, estimated by the movable area estimate unit 303.

Figure 9:
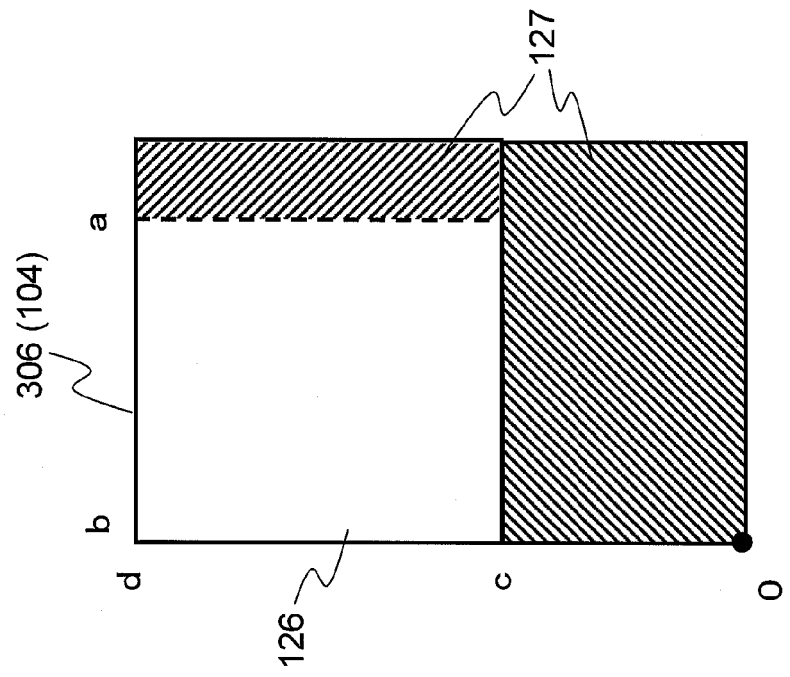
FIG. 9(A) and FIG. 9(B) are illustrations to explain an invalid area of the back side input unit in the handheld terminal according to the first embodiment of the present invention.
Figure 9:
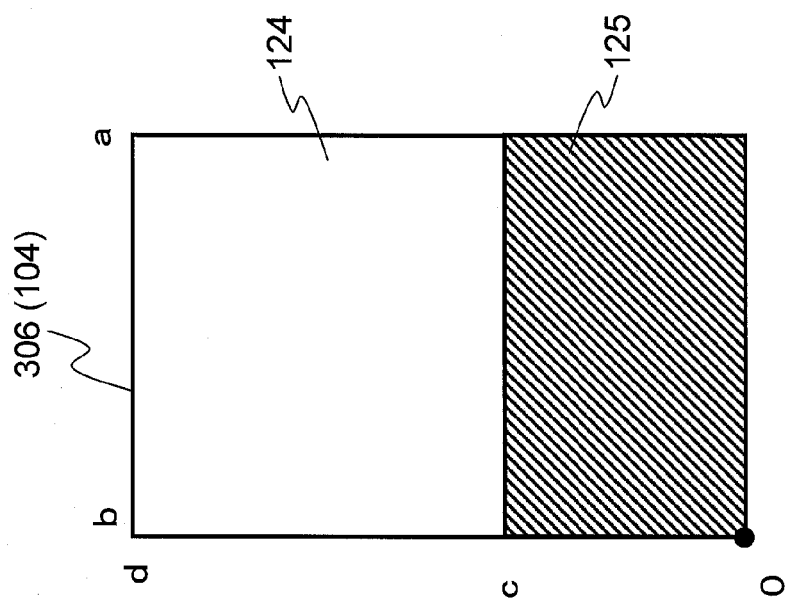

FIG. 9(A) and FIG. 9(B) are illustrations to explain an invalid area of the back side input unit 306. FIG. 9(A) and FIG. 9(B) are illustrations viewed from the back side of the handheld terminal 100.

FIG. 9(A) shows an example that only an area below an estimated movable area 124 of the forefinger 111 of the user is determined the invalid area 125. In this case, the estimated movable area 124 of the forefinger 111 is an area not limited about the right and left direction of the back side input unit 306. Oblique lines which go from the top right corner to the lower left fill the invalid area 125.

FIG. 9(B) shows an example that all areas except the estimated movable area 126 of the forefinger 111 are determined an invalid area 127 besides the area below the estimated movable area 126 of the forefinger 111 of the user. In FIG. 9(B), oblique lines which go from the top left corner to the lower right fill the added invalid area.

In these both examples, all of the area below the estimated movable area 124 or 126 of the forefinger 111 of the user on the back side input unit 306 is determined as the invalid area 125 or 127. These originate in that the handheld terminal 100 has a size which can be operated with one hand such as a smartphone. This is because width of the handheld terminal 100 is narrow.

The processes of the step S323 and the step S324 described above correspond to a detection area restriction step of the present invention.

At step S325, the input position analysis unit 307 monitors an input on the back side input unit 306.

At step S326, when there is an input on the back side input unit 306, the input position analysis unit 307 outputs a position coordinate (x1, y1) of the input to the valid area restriction unit 308. The valid area restriction unit 308 judges whether the position coordinate (x1, y1), which is outputted by the input position analysis unit 307, of the input on the back side input unit 306 is included in the invalid area 125 or 127 outputted by the invalid area determination unit 305.

At step S327, when the position coordinate (x1, y1), which is outputted by the input position analysis unit 307, of the input on the back side input unit 306 is included in the invalid area 125 or 127 outputted by the invalid area determination unit 305, the valid area restriction unit 308 doesn't output the position coordinate (x1, y1) to the input information processing unit 309. That is, the position coordinate (x1, y1), which is outputted by the input position analysis unit 307, of the input on the back side input unit 306 is destroyed.

On the other hand, at step S328, when the position coordinate (x1, y1), which is outputted by the input position analysis unit 307, of the input on the back side input unit 306 is not included in the invalid area 125 or 127 outputted by the invalid area determination unit 305, the valid area restriction unit 308 outputs this position coordinate (x1, y1) to the input information processing unit 309.

The input information processing unit 309 outputs the position coordinate (x, y), which is outputted by the input position analysis unit 302, of the thumb 110 of the user on the face side input unit 301 and the position coordinate (x1, y1), which is outputted by the valid area restriction unit 308, of the input on the back side input unit 306 to the display control unit 310.

The display control unit 310, according to the position coordinate (x, y) of the thumb 110 of the user on the face side input unit 301 and the position coordinate (x1, y1) in the input on the back side input unit 306, performs drawing process of choice of icons or movement of a cursor and displays it on the display unit 311. In this case, the position coordinates (x, y) and (x1, y1) outputted by the input information processing unit 309 are used.

In the case of the step S327, the input is more likely to be an input through any of the middle finger 112, the third finger 113 and the little finger 114 of the user touching the back side input unit 306. Then, the valid area restriction unit 308 doesn't output the position coordinate (x1, y1) of this input to the input information processing unit 309. On the other hand, in the case of the step S328, the input is more likely to be an input through the forefinger 111 of the user touching the back side input unit 306. Then, in this case, the valid area restriction unit 308 outputs the position coordinate (x1, y1) of this input to the input information processing unit 309. In this way, it is possible to reduce the problem that a pointing with the forefinger can't be done as intended because the middle finger 112, the third finger 113 or the little finger 114 touches the back side input unit 306.

In this way, the handheld terminal 100 of the first embodiment prevents a false detection which is caused by the contact with fingers which should not be used for pointing, by determining the invalid area 125 or 127 on the back side input unit 306 according to the position coordinate (x, y) of the thumb 110 of the user on the face side input unit 301 and judging whether the position coordinate (x1, y1) in the input later detected on the back side input unit 306 is included in the invalid area 125 or 127.

For example, the following information that was found statistically can be used as the information, recorded in advance in the table 304, about the movable area of the forefinger 111 which corresponds to a position of the thumb 110 of the user when the user holds the handheld terminal 100 with one hand. That is, when a forefinger is moved by holding the handheld terminal 100 with one hand and fixing the position of a thumb of the one hand, information of the area that the forefinger can move on the back side is acquired about many people, and information of an average value of the acquired information can be used as the information recorded in the table 304.

An example of a concrete method for acquiring the information of the average value described above is described with reference to FIG. 6(A), FIG. 6(B) and FIG. 7. Here, an example of acquiring information about the right hand is described.

Figure 6:
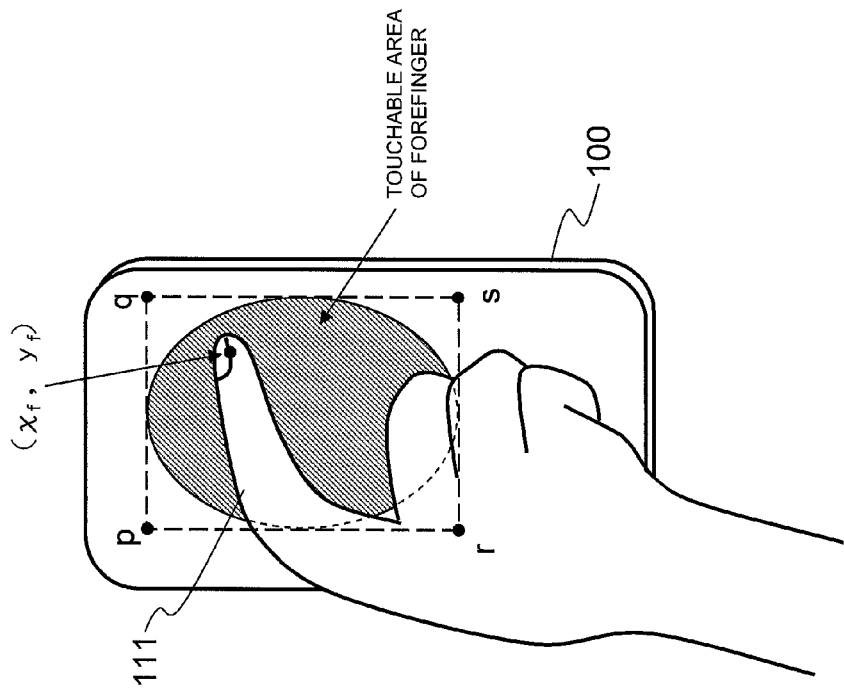
FIG. 6(A) and FIG. 6(B) are figures to explain a method for acquiring information about a certain one person according to the first embodiment of the present invention.
Figure 6:
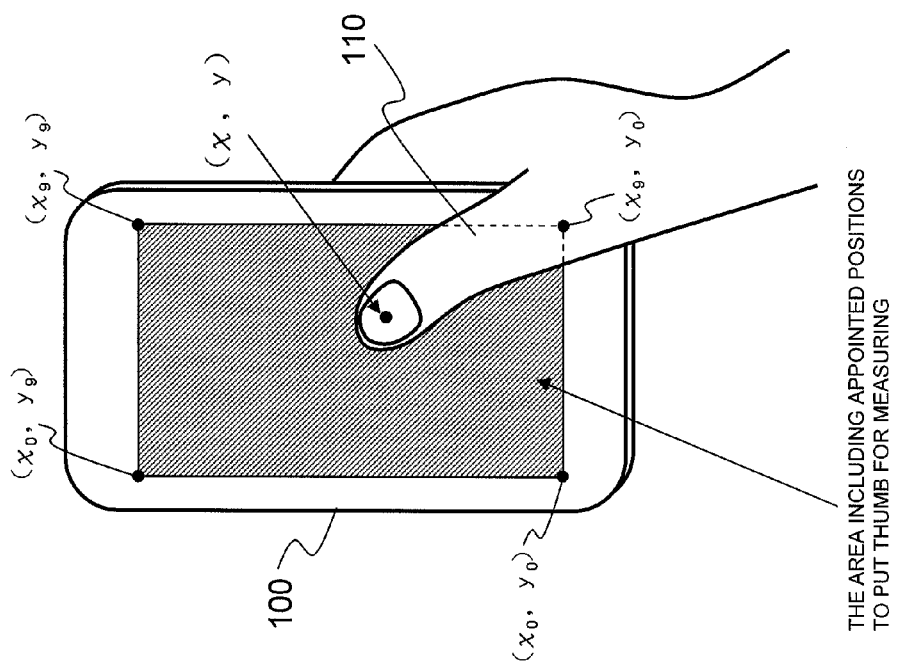

FIG. 6(A) and FIG. 6(B) are figures to explain a method for acquiring information about a certain one person. FIG. 6(A) shows the face side of the handheld terminal 100 which is held with right hand, and FIG. 6(B) shows the back side of the handheld terminal 100.

When the certain one person holds the handheld terminal 100 with his right hand, he puts his thumb 100 on an appointed position (a position of coordinate (x, y)) on the face side of the handheld terminal 100 as shown in FIG. 6(A). When he moves his forefinger 111 under such state that his thumb 110 is put on the appointed position, touchable positions (positions of coordinate $(x_f, y_f)$ of the forefinger 111 on the back side are measured as shown in FIG. 6(B).

The area filled with oblique lines in FIG. 6(B) shows the touchable area of the forefinger 111 on the back side when the thumb 110 is put on the position of the coordinate (x, y) on the face side.

A rectangle area, which is surrounded in broken lines in FIG. 6(B), including the touchable area of the forefinger 111, is found, and each of coordinate values of the four vertexes, "p", "q", "r", and "s", of the rectangle assume as measurement value.

About the certain one person, he puts his thumb 110 on each of a plurality of appointed positions, and these coordinate values which correspond to the appointed positions of his thumb 110 respectively are measured.

The area filled with oblique lines in FIG. 6(A) shows an area including the plurality of the appointed positions to put the thumb 110 for measuring these coordinate values. For example, in the area filled with oblique lines in FIG. 6(A), the thumb 110 is put on each of the appointed positions, which are $(x_0, y_0)$, $(x_0, y_1)$, $(x_0, y_2)$, ..., $(x_0, y_9)$, $(x_1, y_0)$, ..., $(x_9, y_8)$, $(x_9, y_9)$. And when the coordinates values as above for each position of the thumb 110 are measured, each coordinate values of vertexes, "p", "q", "r", and "s" are acquired at every appointed position of the thumb fixed. Therefore, in this case, the measurement results of one hundred pairs each of which has coordinate values of vertexes, "p", "q", "r", and "s" are acquired.

The same measurement as above is carried out for each person of a large number of people. The measurement results of one hundred pairs of the coordinate values as above are acquired for each person. Therefore, for example, when the measurement as above is carried out for each person of one hundred people, the measurement results of ten thousands pairs of the coordinate values as above are acquired.

Then, the average value of the movable area of the forefinger 111 according to each position of the thumb 110 fixed can be calculated by using the measurement results of a large number of people.

FIG. 7 is an illustration to explain how the average value of the movable area of the forefinger 111 according to each position of the thumb 100 fixed is calculated.

The average value of each coordinate value can be calculated from each coordinate value of the vertexes, "p", "q", "r", and "s" which are measured when each person puts his thumb 110 on the coordinate position $(x_0, y_0)$.

When the measurement is carried out for one hundred people, as shown in FIG. 7, the measurement results of one hundred pairs of each coordinate value of the vertexes, "p", "q", "r", and "s" are acquired. The average coordinate value of the vertex "p" can be calculated by averaging the coordinate values of the vertex "p" measured for each person. In this case, the average coordinate value of the vertex "p" can be calculated by averaging one hundred coordinate values of the vertex "p". Similarly, each of the average coordinate value of the vertexes, "q", "r", and "s", can be calculated.

The rectangle area which is surrounded by each average coordinate value of the vertexes "p", "q", "r", and "s" acquired in this way can assume as the average value of the movable area of the forefinger 111 at the time that the thumb 110 is put on the coordinate position $(x_0, y_0)$.

Similarly, the average value of the movable area of the forefinger 111 can be calculated at every appointed positions of the thumb 100 fixed. In this example, as shown in FIG. 6(A), the measurement is carried out by putting the thumb 110 on each of one hundred appointed positions. Then, as shown in FIG. 7, the average value of the movable area of the forefinger 111 can be calculated at every one hundred appointed positions.

By relating the average values of the movable area of the forefinger 111 acquired in this way to the coordinate position of the thumb 110, and recording the average values in the table 304 in advance, the average values can be used as information of the movable area of the forefinger 111.

The size of the movable area of the forefinger 111 of the user can use values calculated statistically. For example, in FIG. 8(B), the size (b-a) of the movable area of the x1 direction of the forefinger 111 of the user is around 5 cm, and the size (d-c) of the movable area of the y1 direction of the forefinger 111 of the user is around 5 cm. Then, the movable area of the forefinger 111 of the user is estimated to be a rectangular area of around 5 cm by 5 cm. In the example of FIG. 8(B), the estimated movable area 123 of the forefinger 111 estimated by the movable area estimate unit 303 is limited in the left area by the coordinate "a" of the x direction of the back side input unit 306. However, when the width of the handheld terminal 100 is narrow, it may be that the estimated movable area 123 of the forefinger 111 estimated by the movable area estimate unit 303 is not limited about the right and left direction of the back side input unit 306. For example, it is shown in FIG. 9(A). In this case, the coordinate "a" of the x direction becomes the right-side end position of the back side input unit 306.

In the handheld terminal 100 of the first embodiment, the estimated movable area 123, which corresponds to the position coordinate (x, y) of the thumb 110 of the user, of the forefinger 111 on the back side input unit 306 is stored in the table 304. However, when the size of the movable area of the forefinger 111 of the user is made a constant value regardless of the position coordinate of the thumb 110 of the user, the reference point for the movable area of the forefinger 111 of the user can be prescribed by adding or subtracting a constant offset value to the position coordinate (x, y) of the thumb 110 of the user. Therefore, it is not necessary that the table 304 is always provided, and it is enough that only the offset value for each the x1 direction and the y1 direction, which corresponds to the position coordinate of the thumb 110, are recorded. In this case, the offset value for each the x1 direction and the y1 direction which corresponds to the position coordinate of the thumb 110 corresponds to an example of information determined in advance according to the present invention.

A plurality of tables or calculating formulas provided statistically are prepared in advance and information which makes it possible to estimate the contact position of the forefinger 111 with the back side according to the position of the thumb 110 of the face side when the handheld terminal 100 is held with one hand may be inputted by the user at the time of the initial setting before starting operation for the handheld terminal 100 by the user. The information to let the user input is, for example, user's height, the distance from a fingertip of the thumb 110 to a fingertip of the forefinger 111 when user's palm is opened, user's sex, or the like. Then, a table is chosen according to the input information and can be used, or the forefinger position can be calculated using a formula according to the input information.

In the other method, at the time of the initial setting before starting operation for the handheld terminal 100 by the user, the thumb 110 of the user is made to touch an appointed position on the touch panel 101 by using the indication mechanism of the liquid crystal display 102 and the forefinger 111 of the user is made to perform moving with touching the back side. And, the estimated movable area of the forefinger 111 which matches the user can be determined according to the information of the touch position on the back side which is acquired at the time.

Furthermore, the history of the position information is acquired when the user points on the back side, the position which is pointed by the user is learned according to the history, and the estimated movable area of the forefinger 111 which is set first can be narrowed step by step. In this way, the estimated movable area of the forefinger 111 becomes more suitable for the user with progress of the time. Then, the false detection which is caused by the contact with fingers which should not be used for pointing can be prevented more surely.

It is described in the first embodiment about the case that the handheld terminal 100 is operated by the right hand. This invention can be applied at the case that the handheld terminal 100 is operated by the left hand, too. In this case, the user sets up information that he is right-handed or left-handed, at the time of the initial setting of the handheld terminal 100. The correspondences between the position coordinate of the thumb of the user and the movable area of the forefinger are recorded on the table 304 about each of right hand and left hand. When the user is right-handed, the movable area estimate unit 303 refers to the correspondence between the position coordinate of the thumb of the right hand and the movable area of the forefinger of the right hand. When the user is left-handed, the movable area estimate unit 303 refers to the correspondence between the position coordinate of the thumb of the left hand and the movable area of the forefinger of the left hand. And the movable area estimate unit 303 estimates the movable area of the forefinger of the user by referring to this information.

In the first embodiment, the movable area estimate unit 303 estimates the movable area of the forefinger 111 on the back side input unit 306 according to the position coordinate (x, y) of the thumb 110 on the face side input unit 301 when the power supply of the handheld terminal 100 is turned on. However, it is not necessary that the estimated movable area 123 of the forefinger 111 on the back side input unit 306 is always estimated in this timing. For example, while most of the position coordinate (x, y) of the thumb 110 on the face side input unit 301 do not change, the estimated movable area 123 of the forefinger 111 on the back side input unit 306 can be estimated appropriately.

In the first embodiment, the estimated movable area 123 of the forefinger 111 on the back side input unit 306 is estimated according to the position coordinate of the thumb 110 on the face side input unit 301. Furthermore, the invalid area 125 or 127 on the back side input unit 306 is determined according to the estimated movable area 123 of the forefinger 111 on the back side input unit 306. However, it is not necessary that the estimated movable area 123 of the forefinger 111 on the back side input unit 306 is always estimated. For example, the invalid area 125 or 127 on the back side input unit 306 can be determined directly according to the position coordinate of the thumb 110 on the face side input unit 301.

In the first embodiment, the invalid area 125 or 127 is determined and the touch information of the invalid area 125 or 127 is not used. Areas except the invalid area 125 or 127 on the back side input unit 306 can be assumed valid areas, and only the touch information in the valid areas can be used.

From a different point of view, a movable area of the thumb 110 of the user on the face side input unit 301 can be estimated according to the position coordinate of the thumb 110 on the face side input unit 301. Furthermore, the invalid area on the back side input unit 306 can be determined according to the movable area of the thumb 110 of the user on the face side input unit 301. In brief, it is enough that the invalid area on the back side input unit 306 is determined according to the information about the thumb 110 touching on the face side input unit 301.

In the first embodiment, it is assumed that the back side input unit 306 is operated by the forefinger 111. This invention can be applied at the case that the back side input unit 306 is operated by the middle finger 112, too. In this case, the user sets his forefinger 111 or his middle finger 112 for operating the back side input unit 306, at the time of the initial setting of the handheld terminal 100. In this case, the correspondence between the position coordinate of the thumb 110 of the user and the movable area of the middle finger 112, in addition the correspondence between the position coordinate of the thumb 110 of the user and the movable area of the forefinger 111, is recorded on the table 304. When the back side input unit 306 is operated by forefinger 111, the movable area estimate unit 303 refers to the correspondence between the position coordinate of the thumb 110 and the movable area of the forefinger 111 and estimates the movable area of the forefinger 111 of the user. On the other hand, when the back side input unit 306 is operated by middle finger 112, the movable area estimate unit 303 refers to the correspondence between the position coordinate of the thumb 110 and the movable area of the middle finger 112 and estimates the movable area of the middle finger 112 of the user.

The invalid area determination unit 305 determines the invalid area on the back side input unit 306 according to the estimated movable area of the forefinger 111 or the estimated movable area of the middle finger 112 of the user. When the back side input unit 306 is operated by the forefinger 111, an area below the estimated movable area of the forefinger 111 of the user is determined as the invalid area. On the other hand, when the back side input unit 306 is operated by the middle finger 112, an area below the estimated movable area of the middle finger 112 of the user and an area above the estimated movable area of the middle finger 112 of the user can be determined as the invalid areas. In this case, the third finger 113 or the little finger 114 of the user may touch the area below the estimated movable area of the middle finger 112 of the user, and the forefinger 111 of the user may touch the area above the estimated movable area of the middle finger 112 of the user. In this way, even if the back side input unit 306 is operated by the middle finger 112, the problem that a pointing with the middle finger 112 can't be done as intended because the forefinger 111, the third finger 113 or the little 114 finger touches the back side input unit 306, can be reduced.

Second Embodiment

In a second embodiment of the present invention, such an embodiment is described that a handheld terminal such as a tablet-type terminal or a terminal for reading, which is one size bigger than a smartphone, is operated with both hands.

The constitution of a handheld terminal 200 of the second embodiment is basically same as the constitution of the handheld terminal 100 of the first embodiment. However, for example, a face side input unit 401 of the second embodiment is a capacitive-type touch panel. The capacitive-type touch panel can detect many points at the same time. With this point, as described after, the block diagram of the handheld terminal 200 of the second embodiment is different from the block diagram of the handheld terminal 100 of the first embodiment. The size of the handheld terminal 200 of the second embodiment is different from the size of the handheld terminal 100 of the first embodiment. The handheld terminal 200 of the second embodiment is bigger than the handheld terminal 100 of the first embodiment.

External views of the handheld terminal 200 of the second embodiment that is held with both hands are shown in FIG. 10(A) and FIG. 10(B). FIG. 10(A) shows a face side of the handheld terminal 200, FIG. 10(B) shows a back side of the handheld terminal 200.

As shown in FIG. 10(A), the touch panel 201 arranged on the face side of the handheld terminal 200 is operated by the thumbs of both hands of the user. The touch panel 201 arranged on the face side of the handheld terminal 200 is capacitive-type and can detect many points at the same time.

As shown in FIG. 10(B), a touchpad 204 arranged on the back side of the handheld terminal 200 is operated by the forefingers of both hands of the user. The touchpad 204 arranged on the back side of the handheld terminal 200 is capacitive-type and can detect many points at the same time. Then, the middle fingers, the third fingers or the little fingers of both hands of the user comes in contact with the touchpad 204 arranged on the back side of the handheld terminal 200. Therefore, the pointing by the forefingers of both hands cannot be done as intended.

The touch panel 201 corresponds to an example of a first touch type position detection unit which detects two of the first touch positions at the same time according to the present invention. The touchpad 204 corresponds to an example of a second touch type position detection unit according to the present invention.

Figure 11:
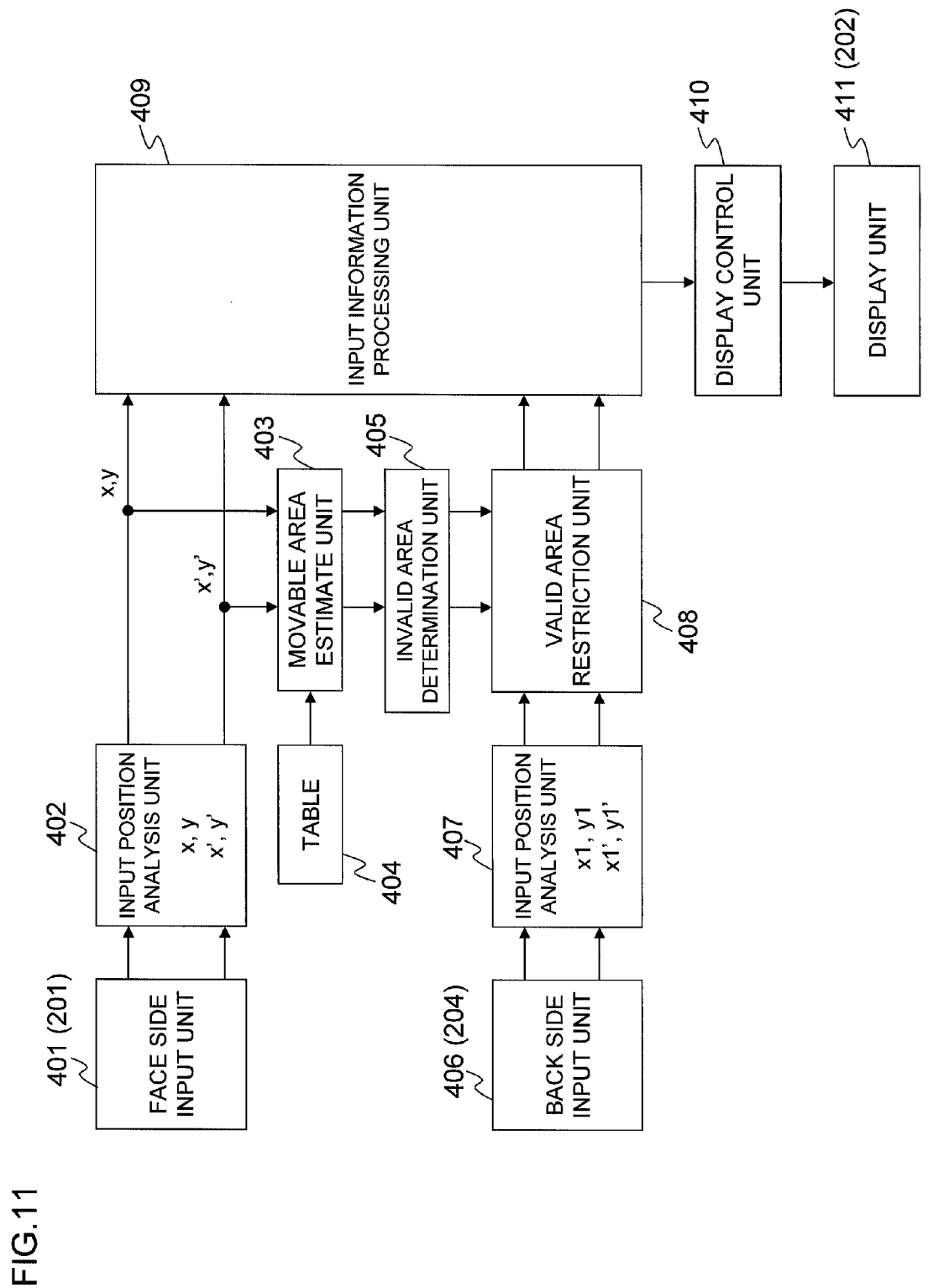
FIG. 11 is a block diagram of the handheld terminal according to the second embodiment of the present invention.

A block diagram of the handheld terminal 200 of the second embodiment is shown in FIG. 11.

A face side input unit 401 in FIG. 11 corresponds to the touch panel 201 in FIG. 10(A). A back side input unit 406 in FIG. 11 corresponds to the touchpad 204 in FIG. 10(B). A display unit 411 in FIG. 11 corresponds to the liquid crystal display 202 in FIG. 10(A).

Output of a face side input unit 401 is inputted to an input position analysis unit 402. The input position analysis unit 402 outputs a position coordinate (x, y) and a position coordinate (x', y') of the thumbs of both hands on the face side input unit 401.

Output of a back side input unit 406 is inputted to an input position analysis unit 407. The input position analysis unit 407 outputs a position coordinate (x1, y1) and a position coordinate (x1', y1') of the positions where the fingers of both hands of the user touch the back side input unit 406. At that time, there is such possibility that the middle fingers, the third fingers and the little fingers of both hands of the user may come in contact with the back side input unit 406 in addition to the forefingers of both hands of the user.

When a position coordinate which the input position analysis unit 402 outputs is the position coordinate included in the right half of the face side input unit 401, a movable area estimate unit 403 judges that this position coordinate is a position coordinate (x, y) of the thumb of the right hand of the user. On the other hand, when a position coordinate which the input position analysis unit 402 outputs is the position coordinate included in the left half of the face side input unit 401, the movable area estimate unit 403 judges that this position coordinate is a position coordinate (x', y') of the thumb of the left hand of the user.

The movable area estimate unit 403 refers to a table 404 and estimates a movable area of the forefinger of the right hand of the user on the back side input unit 406 according to the position coordinate (x, y) of the thumb of the right hand of the user which is outputted by the input position analysis unit 402. Similarly, the movable area estimate unit 403 refers to the table 404 and estimates a movable area of the forefinger of the left hand of the user on the back side input unit 406 according to the position coordinate (x', y') of the thumb of the left hand of the user which is outputted by the input position analysis unit 402.

An invalid area determination unit 405 determines invalid areas on the back side input unit 406 according to the output of the movable area estimate unit 403. That is, for example, an area below the estimated movable area of the forefinger of the right hand of the user on the back side input unit 406 is determined as a first invalid area. Similarly, an area below the estimated movable area of the forefinger of the left hand of the user on the back side input unit 406 is determined as a second invalid area. Then, two areas are determined as the invalid areas.

A valid area restriction unit 408 judges whether the position coordinate (x1, y1) or the position coordinate (x1', y1'), which is outputted by the input position analysis unit 407, of the position where the finger of the user touches on the back side input unit 406 is included in the invalid areas outputted by the invalid area determination unit 405.

When the position coordinate (x1, y1) or (x1', y1'), which is outputted by the input position analysis unit 407, of the position where the finger of the user touches on the back side input unit 406 is included in the first invalid area or the second invalid area outputted by the invalid area determination unit 405, the valid area restriction unit 408 doesn't output the position coordinate (x1, y1) or (x1', y1') to an input information processing unit 409. In this case, the position coordinate (x1, y1) or (x1', y1') where touch is detected is more likely to be a position coordinate outputted as a result that any of the middle fingers, the third fingers and the little fingers of both hands of the user touches the back side input unit 406. Therefore, the valid area restriction unit 408 doesn't output this position coordinate to the input information processing unit 409.

On the other hand, when the position coordinate (x1, y1) or (x1', y1'), which is outputted by the input position analysis unit 407, of the position where the finger of the user touches on the back side input unit 406 is included in none of the first invalid area and the second invalid area outputted by the invalid area determination unit 405, the valid area restriction unit 408 outputs this position coordinate (x1, y1) or (x1', y1') to an input information processing unit 409. In this case, the position coordinate (x1, y1) or (x1', y1') where touch is detected is more likely to be a position coordinate outputted as a result that either of the forefingers of both hands of the user touches the back side input unit 406. Therefore, the valid area restriction unit 408 outputs this position coordinate to the input information processing unit 409.

In this way, the problem that a pointing with either of the forefingers of both hands can't be done as intended because any of the middle fingers, the third fingers and the little fingers of both hands touches the back side input unit 406, can be reduced.

The input information processing unit 409 gets position coordinates (x, y) and (x', y'), which are outputted by the input position analysis unit 402, of the thumbs of both hands of the user and position coordinates (x1, y1) and (x1', y1'), which are outputted by the valid area restriction unit 408, of the forefingers of both hands of the user in this way. The input information processing unit 409 outputs, to a display control unit 410, the position coordinates (x, y) and (x', y') of the thumbs of both hands of the user and the position coordinate (x1, y1) or (x1', y1') of the forefingers of both hands of the user. The display control unit 410 controls a display unit 411 appropriately according to the position coordinates (x, y) and (x', y') of the thumbs of both hands and the position coordinate (x1, y1) or (x1', y1') of the forefingers of both hands of the user which are outputted by the input information processing unit 409.

Figure 12:
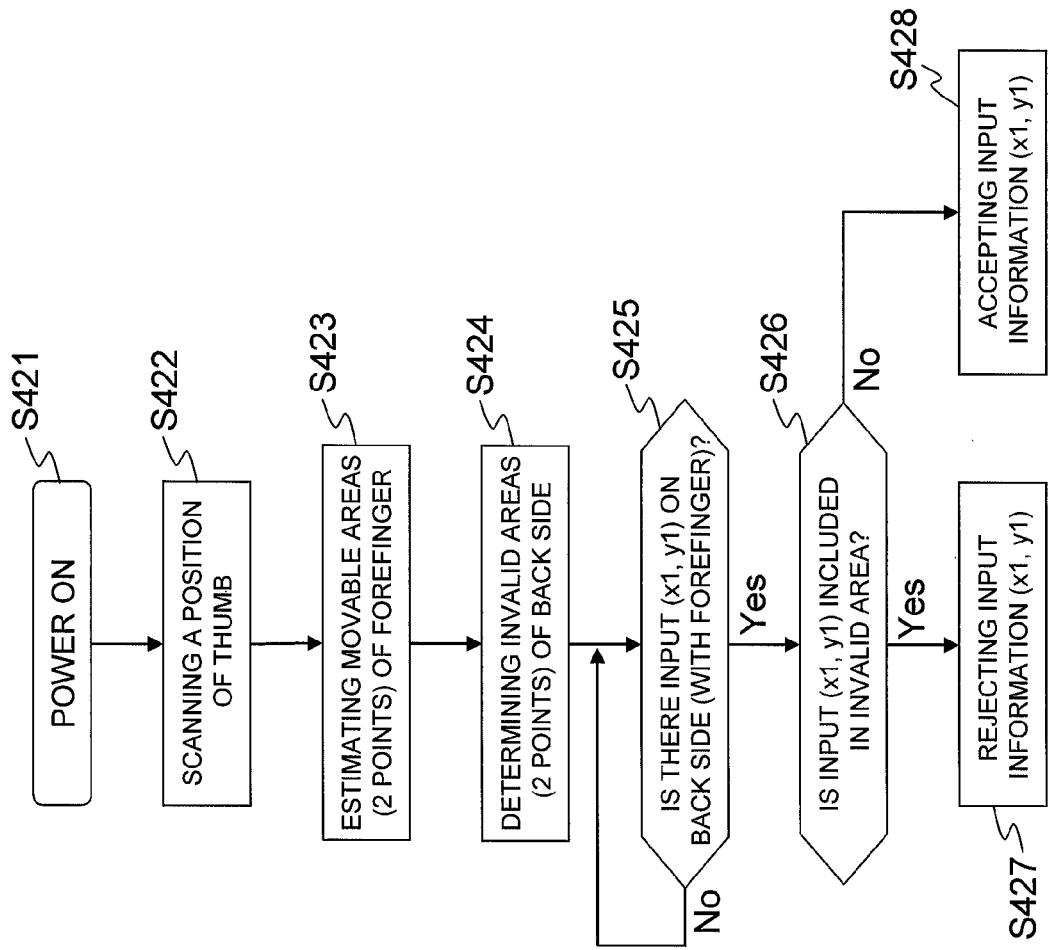
FIG. 12 is a flow chart for illustrating operations of the handheld terminal according to the second embodiment of the present invention.

A flow chart for operations of the handheld terminal of the second embodiment is shown in FIG. 12.

The operations of the handheld terminal of the second embodiment are described with reference to FIG. 11 in accordance with the flow chart of FIG. 12.

At step S421, the user operates a power switch (not illustrated) and switches on the handheld terminal 200.

At step S422, the input position analysis unit 402 determines the position coordinates (x, y) and (x', y') of the thumbs of both hands of the user according to the output of the face side input unit 401.

Figure 13:
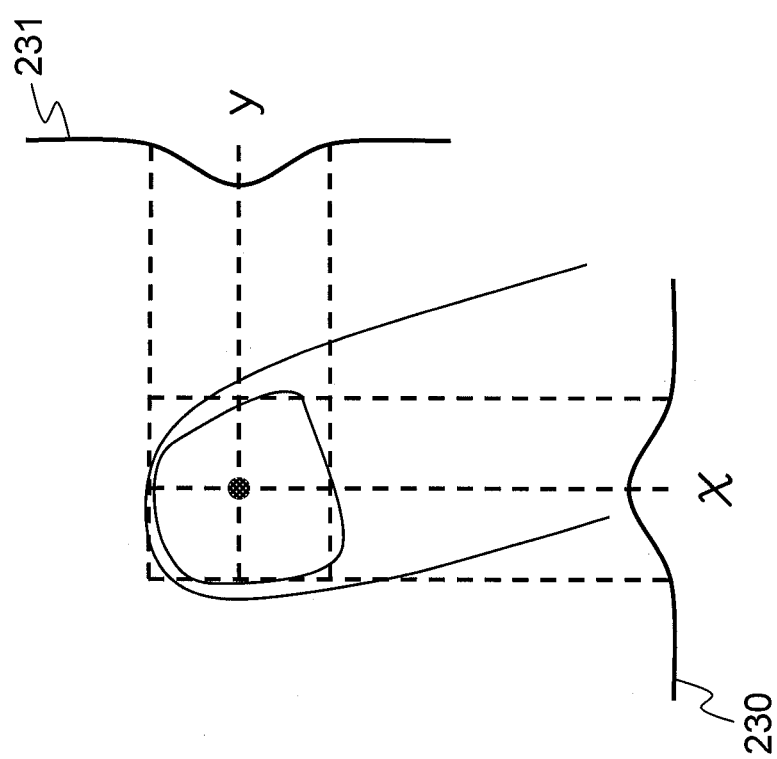
FIG. 13 is an illustration of an image to explain how a position coordinate of a thumb of a user is determined in the handheld terminal according to the second embodiment of the present invention.

FIG. 13 is an image illustration to explain how the input position analysis unit 402 determines the position coordinate (x, y) of the thumb of the right hand of the user.

The thumb of the right hand of the user touches the face side input unit 401. The capacitive-type touch panel 201 can specify the touch position of x direction and y direction on the touch panel 201 by measuring capacitance of the transparent electrode.

The touch panel 201 is a capacitive-type touch panel which is projection type. Capacitance distributions 230 and 231 are detected in a uniform area of each of the x direction and y direction of the touch panel 201. The input position analysis unit 402 assumes that a peak of range of the x direction where the capacitance distribution 230 is detected is the x coordinate of the position of the thumb of the right hand of the user. Similarly, the input position analysis unit 402 assumes that a peak of range of the y direction where the capacitance distribution 231 is detected is the y coordinate of the position of the thumb of the right hand of the user. The position coordinates of the thumb of the left hand of the user can be determined similarly.

The above is one of the simplest methods for the input position analysis unit 402 to determine the position coordinates of the thumbs of both hands of the user. But, the input position analysis unit 402 can use any kind of method to determine position coordinates of the thumbs of both hands of the user.

At step S423, when a position coordinate which the input position analysis unit 402 outputs is the position coordinate included in the right half of the face side input unit 401, the movable area estimate unit 403 judges that this position coordinate is a position coordinate (x, y) of the thumb of the right hand of the user. On the other hand, when a position coordinate which the input position analysis unit 402 outputs is the position coordinate included in the left half of the face side input unit 401, the movable area estimate unit 403 judges that this position coordinate is a position coordinate (x', y') of the thumb of the left hand of the user.

Figure 8:
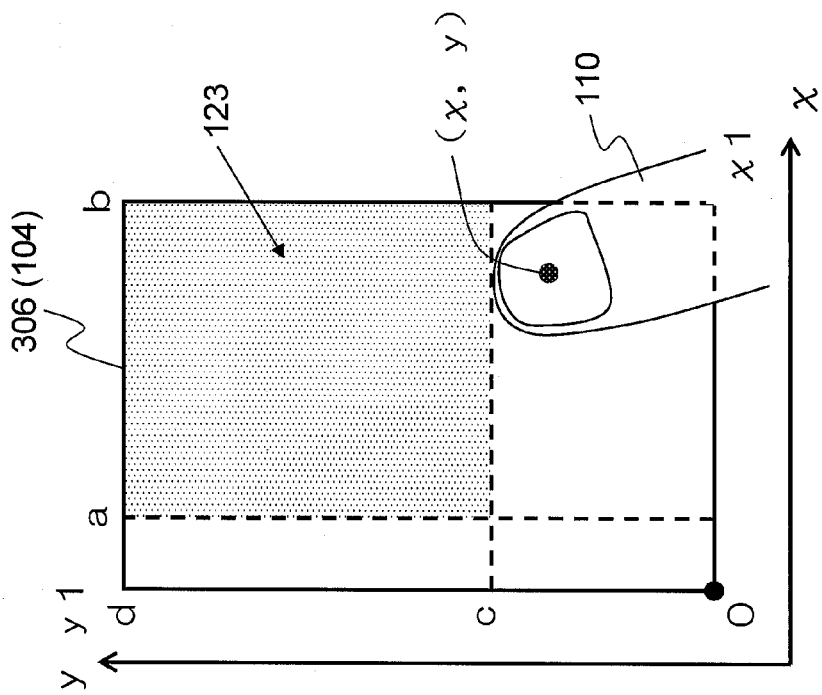
FIG. 8(A) is an illustration of a table used to estimate a movable area of a forefinger of a user according to the first embodiment of the present invention.
FIG. 8(B) is an illustration which shows a correspondence of a face side input unit and a back side input unit to explain how the movable area of the forefinger of the user is estimated in the handheld terminal according to the first embodiment of the present invention.
Figure 8:
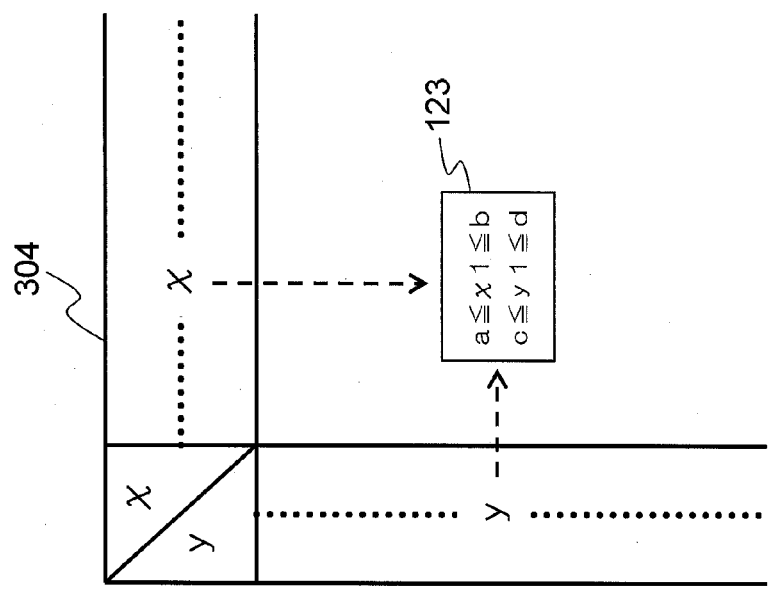

The movable area estimate unit 403 refers to the table 404 and estimates the movable area of the forefinger of the right hand of the user on the back side input unit 406 according to the position coordinate (x, y) of the thumb of the right hand of the user, which is outputted by the input position analysis unit 402. Similarly, the movable area estimate unit 403 refers to the table 404 and estimates the movable area of the forefinger of the left hand of the user on the back side input unit 406 according to the position coordinate (x', y') of the thumb of the left hand of the user, which is outputted by the input position analysis unit 402. The movable areas of the forefingers of both hands of the user are estimated using the table 404 like the table 304 which is shown in FIG. 8. The correspondence between the position coordinate of the thumb of the user and the movable area of the forefinger is recorded on the table 404 about each of right hand and left hand.

FIG. 14(A) and FIG. 14(B) are illustrations to explain invalid areas of the back side input unit in the handheld terminal 200 of the second embodiment. FIG. 14(A) shows the face side input unit 401. FIG. 14(B) shows the back side input unit 406.

FIG. 14(A) shows the position coordinate R (x, y) of the thumb of the right hand of the user and the position coordinate L (x', y') of the thumb of the left hand of the user. The movable area estimate unit 403 refers to the table 404 and estimates that the movable area R of the forefinger of the right hand of the user on the back side input unit 406 is an area which shows "g<=x1<=h" as the coordinate x1 of the x direction and shows "m<=y1<=n" as the coordinate y1 of the y direction, according to the position coordinate R (x, y) of the thumb of the right hand of the user.

Similarly, the movable area estimate unit 403 refers to the table 404 and estimates that the movable area L of the forefinger of the left hand of the user on the back side input unit 406 is an area which shows "e<=x1<=f" as the coordinate x1 of the x direction and shows "j<=y1<=k" as the coordinate y1 of the y direction, according to the position coordinate L (x', y') of the thumb of the left hand of the user.

At step S424, the invalid area determination unit 405 determines the invalid area R on the back side input unit 406 according to the estimated movable area R of the forefinger of the right hand of the user. Similarly, the invalid area determination unit 405 determines the invalid area L on the back side input unit 406 according to the estimated movable area L of the forefinger of the left hand of the user. The invalid area R is an area which indicates "g<=x1<=h" as the coordinate x1 of the x direction and indicates "l<=y1<=m" as the coordinate y1 of the y direction. The invalid area L is an area which indicates "e<=x1<=f" as the coordinate x1 of the x direction and indicates "i<=y1<=j" as the coordinate y1 of the y direction. The invalid area R corresponds to the first invalid area mentioned above, and the invalid area L corresponds to the second invalid area mentioned above.

In this case, length of x direction of the invalid area R is assumed to be the same length of the x direction of the movable area R of the forefinger of the right hand of the user and, for example, length of y direction of the invalid area R is assumed to be a fixed length of 10 cm. Similarly, length of x direction of the invalid area L is assumed to be the same length of the x direction of the movable area L of the forefinger of the left hand of the user and, for example, length of y direction of the invalid area L is assumed to be a fixed length of 10 cm. And the invalid area determination unit 405 determines the invalid area R and the invalid area L right below the movable area R and the movable area L respectively.

The above is one of the methods of determining the invalid area R and the invalid area L on the back side input unit 406. Various methods are thought about how the invalid area on the back side input unit 406 is determined according to the movable area of the forefingers of both hands of the user.

A position R which the thumb of the right hand of the user touches corresponds to an example of one of first touch positions according to the present invention. The invalid area R corresponds to an example of a first undetectable area according to the present invention. A position L which the thumb of the left hand of the user touches corresponds to an example of another of the first touch positions according to the present invention. The invalid area L corresponds to an example of a second undetectable area according to the present invention.

At step S425, the input position analysis unit 407 monitors an input on the back side input unit 406.

At step S426, when there is an input on the back side input unit 406, the input position analysis unit 407 outputs a position coordinate (x1, y1) or (x1', y1') of the input to the valid area restriction unit 408. The valid area restriction unit 408 judges whether the position coordinate, which is outputted by the input position analysis unit 407, of the input on the back side input unit 406 is included in the invalid area R or L outputted by the invalid area determination unit 405.

At step S427, when the position coordinate, which is outputted by the input position analysis unit 407, of the input on the back side input unit 406 is included in the invalid area R or L outputted by the invalid area determination unit 405, the valid area restriction unit 408 doesn't output the position coordinate, which is outputted by the input position analysis unit 407, of the input on the back side input unit 406 to an input information processing unit 409. That is, the position coordinate, which is outputted by the input position analysis unit 407, of the input on the back side input unit 406 is destroyed.

On the other hand, at step S428, when the position coordinate, which is outputted by the input position analysis unit 407, of the input on the back side input unit 406 is included in none of the invalid area R and the invalid area L outputted by the invalid area determination unit 405, the valid area restriction unit 408 outputs the position coordinate, which is outputted by the input position analysis unit 407, of the input on the back side input unit 406 to the input information processing unit 409.

The input information processing unit 409 outputs the position coordinates (x, y) and (x', y'), which are outputted by the input position analysis unit 402, of the thumbs of both hands of the user on the face side input unit 401 and the position coordinates (x1, y1) and (x1', y1'), which are outputted by the valid area restriction unit 408, of the input on the back side input unit 406 to the display control unit 410.

The display control unit 410, according to the position coordinates (x, y) and (x', y') of the thumbs of both hands of the user on the face side input unit 401 and the position coordinates (x1, y1) and (x1', y1') of the input on the back side input unit 406, performs drawing process of choice of icons or movement of a cursor and displays it on the display unit 411. In this case, the position coordinates (x, y), (x', y'), (x1, y1) and (x1', y1') outputted by the input information processing unit 409 are used.

In the case of the step S427, the input is more likely to be an input through any of the middle fingers, the third fingers and the little fingers of both hands of the user touching the back side input unit 406. Then, the valid area restriction unit 408 doesn't output the position coordinate (x1, y1) or (x1', y1') of the input to the input information processing unit 409. On the other hand, in the case of the step S428, the input is more likely to be an input through either of the forefingers of both hands of the user touching the back side input unit 406. Then, in this case, the valid area restriction unit 408 outputs the position coordinate (x1, y1) or (x1', y1') of the input to the input information processing unit 409. In this way, it is possible to reduce the problem that a pointing with either of the forefingers can't be done as intended because any of the middle fingers, the third fingers and the little fingers of both hands touched the back side input unit 406.

When the width of the handheld terminal 200 is wide, as shown in FIG. 14(B), the movable areas and the invalid areas which are adjacent horizontally do not overlap. However, when the width of the handheld terminal 200 is narrow to some extent and the handheld terminal 200 is held with both hands, the movable areas and the invalid areas which are arranged at right and left may overlap.

Figure 15:
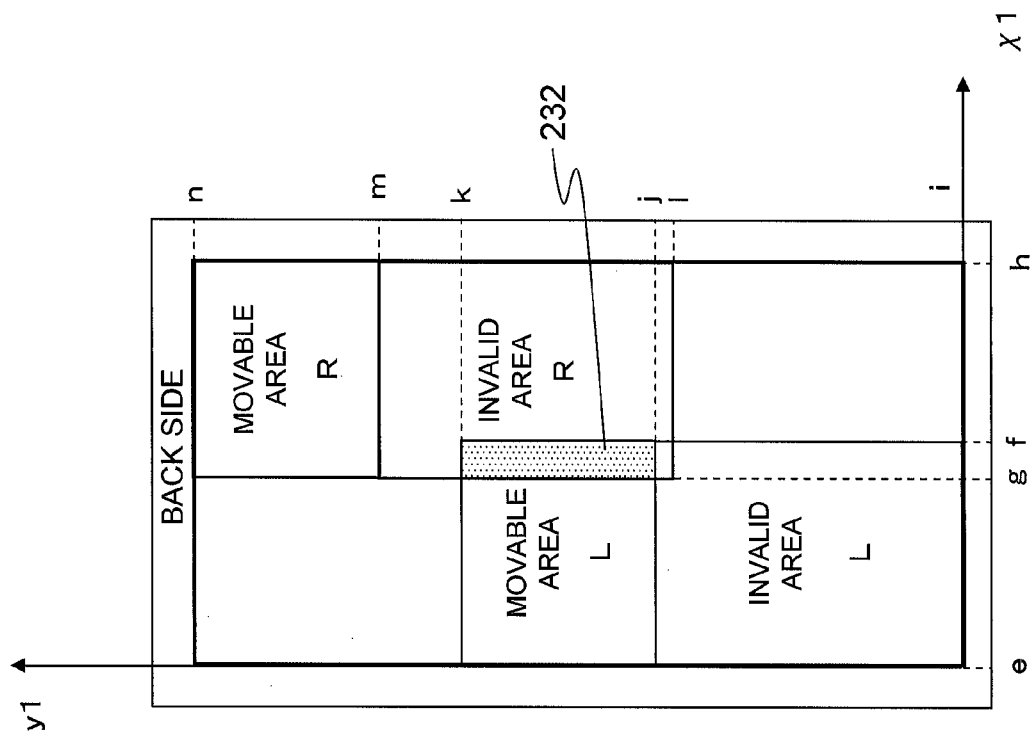
FIG. 15 is an illustration which shows a domain including a movable area and an invalid area on a touchpad of the back side when the width of the handheld terminal is narrow in the handheld terminal according to the second embodiment of the present invention.

FIG. 15 shows each area of the movable area and the invalid area on the touchpad of the back side when the width of the handheld terminal is narrow.

In this case, the forefingers of both hands come into contact at the back side because the width of the handheld terminal is narrow. A duplication area occurs, which is included in both the movable area L of the forefinger of the left hand of the user and the invalid area R of the forefinger of the right hand. The duplication area corresponds to the overlap area of invalid area and valid area 232 which is hatching area in FIG. 15.

When the face side input unit 401 detects a touch at a position in the overlap area of invalid area and valid area 232, it is desirable that the input for the detection is processed as invalid. By processing the input as invalid, the false detection, which is caused by the contact with the middle finger, the third finger and the little finger of the right hand and should not be used for pointing, can be prevented more surely.

A constitution like the modification shown in the first embodiment can be applied to the second embodiment too.

For example, the movable area of the forefinger of the user on the back side input unit 406 is not estimated, and the invalid area on the back side input unit 406 can be determined directly according to the position coordinate of the thumb of the user on the face side input unit 401. In another constitution, the movable area of the thumb of the user on the face side input unit 401 is estimated according to the position coordinate of the thumb of the user on the face side input unit 401, and the invalid area on the back side input unit 406 can be determined according to the estimated movable area of the thumb of the user.

The constitution for operating the back side input unit 406 by the middle finger can be applied to the second embodiment. In this case, the correspondence between the position coordinate of the thumb of the user and the movable area of the middle finger, in addition to the correspondence between the position coordinate of the thumb of the user and the movable area of the forefinger, are recorded on the table 404.

Third Embodiment

In a third embodiment of the present invention, a handheld terminal is described which doesn't have a concept of the top and bottom.

FIG. 16(A) and FIG. 16(B) are illustrations to show a scene of a handheld terminal held with the right hand according to the third embodiment. FIG. 16(A) shows the scene of the handheld terminal 500 held lengthwise with right hand. FIG. 16(B) shows the scene of the handheld terminal 500 held crosswise with left hand.

The handheld terminal 500 of the third embodiment, which differs from each of the handheld terminal 100 of the first embodiment and the handheld terminal 200 of the second embodiment, doesn't have operating buttons. The handheld terminal 100 or 200 which has operating buttons 105 is usually held so that the side arranging the operating buttons 105 becomes the bottom side. However, the handheld terminal 500 which doesn't have the operating buttons can be held so that any side becomes the bottom side.

Figure 17:
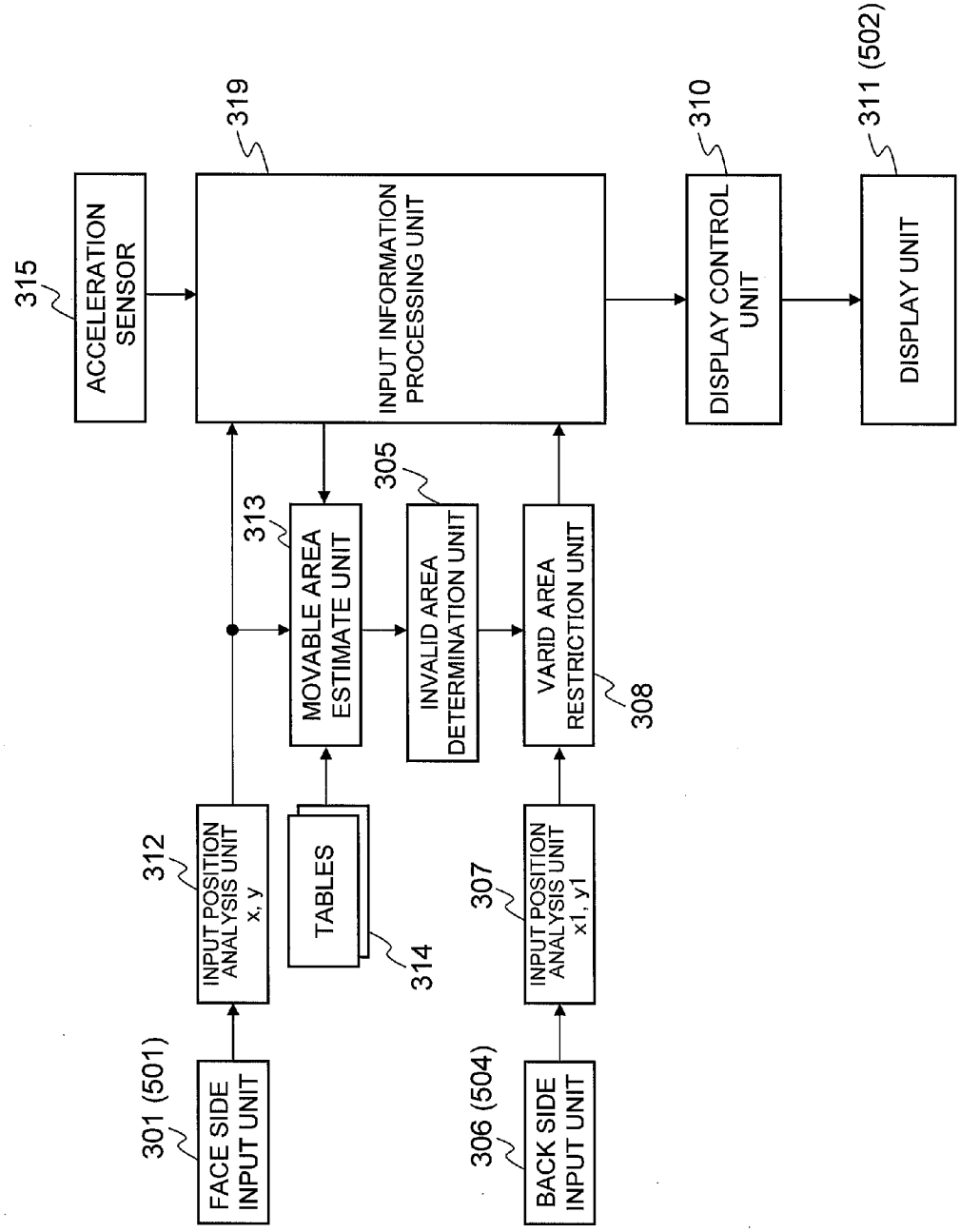
FIG. 17 is a block diagram of the handheld terminal according to the third embodiment of the present invention.

A block diagram of the handheld terminal 500 of the third embodiment is shown in FIG. 17. The same components as those of the handheld terminal 100 of the first embodiment shown in FIG. 3 are indicated by the same reference numerals.

A face side input unit 301 in FIG. 17 corresponds to the touch panel 501 in FIG. 16(A) and FIG. 16(B). A back side input unit 306 in FIG. 17 corresponds to the touchpad 504 in FIG. 16(A) and FIG. 16(B). A display unit 311 in FIG. 17 corresponds to the liquid crystal display 502 in FIG. 16(A) and FIG. 16(B).

Like the handheld terminal 200 of the second embodiment, the handheld terminal 500 has a capacitive-type touch panel 501 in the face side input unit 301. Therefore, an area of the touch panel 501, which the thumb 110 is touching or nearing, can be detected. This area is named a detection area 505. The shape of the detection area 505 is oval and is shown by filling the oval with oblique lines in FIG. 16(A) and FIG. 16(B).

Same as the handheld terminal 100 of the first embodiment, a touchpad 504 which occupies most of the back side is arranged on the back side of the handheld terminal 500.

As shown in FIG. 16(A) and FIG. 16(B), the shape of the area where the thumb 110 touches or nears the touch panel 501 is oval. Then, the direction A of the major axis of the oval area can be calculated.

An input position analysis unit 312 of the third embodiment notifies an input information processing unit 319 of information of the detection area 505 which is detected in the face side input unit 301. The input information processing unit 319 calculates the direction A of the major axis of the oval detection area 505 where the thumb 110 touches or nears the touch panel 501 according to the notified information about the detection area 505.

The handheld terminal 500 has an acceleration sensor 315. Then, the handheld terminal 500 can find a direction G of the gravity. The input information processing unit 319 acquires the direction G of the gravity from the acceleration sensor 315.

The input information processing unit 319 judges whether the handheld terminal 500 is held by the user with the right hand or with the left hand according to the direction A of the major axis of the oval detection area 505 where the thumb 110 touches or nears the touch panel 501 and the direction G of the gravity. When the direction A of the major axis of the oval detection area 505 of the touch panel 501, which the thumb 110 is touching or nearing, is upward to the left on the basis of the direction G of the gravity (for example, the case shown in FIG. 16(A)), the input information processing unit 319 judges that the handheld terminal 500 is held with the right hand of the user. On the other hand, when the direction A of the major axis of the oval detection area 505 of the touch panel 501, which the thumb is touching or nearing, is upward to the right on the basis of the direction G of the gravity (for example, the case shown in FIG. 16(B)), the input information processing unit 319 judges that the handheld terminal 500 is held with the left hand of the user.

In this way, it can be judged whether the handheld terminal 500 is held by the user with the right hand or with the left hand. Then, in the handheld terminal 500 of the third embodiment, an initial setting to indicate whether a user is right-handed or left-handed is not necessary.

A movable-area estimate unit 313 acquires, from the input information processing unit 319, information indicating whether the handheld terminal 500 is held with the right hand or the left hand. When the handheld terminal 500 is held with the right hand of the user, the movable area estimate unit 313 refers to the correspondence, which is recorded in the table 314, between the position coordinate of the thumb of the right hand and the movable area of the forefinger of the right hand and the movable area estimate unit 313 can estimate the movable area of the forefinger of the right hand of the user. On the other hand, when the handheld terminal 500 is held with the left hand of the user, the movable area estimate unit 313 refers to the correspondence, which is recorded in the table 314, between the position coordinate of the thumb of the left hand and the movable area of the forefinger of the left hand and the movable area estimate unit 313 can estimate the movable area of the forefinger of the left hand of the user.

The information, which is recorded in the table 314, indicating the correspondence between the position coordinate of the thumb of the right hand and the movable area of the forefinger of the right hand corresponds to an example of a plurality of pieces of information depending on a holding direction of the body unit according to the present invention. The correspondence, which is recorded in the table 314, between the position coordinate of the thumb of the left hand and the movable area of the forefinger of the left hand corresponds to an example of a plurality of pieces of information depending on a holding direction of the body unit according to the present invention, too.

In this way, even if the handheld terminal 500 is held with either hand, the movable area of the forefinger of the user can be estimated appropriately. Then, the invalid area determination unit 305 can determine the invalid area appropriately with respect to the touchpad 504 in the back side input unit 306.

In this way, it is possible to reduce the problem that a pointing with the forefinger can't be done as intended because each of the middle finger, the third finger and the little finger touched the back side input unit 306.

A direction of an icon 502a which is displayed on the display unit 311 can be changed appropriately according to whether the handheld terminal 500 is held lengthwise or crosswise.

The icon 502a to be displayed depending on the direction in which the handheld unit 500 is held corresponds to an example of screen components according to the present invention.

Fourth Embodiment

In a fourth embodiment of the present invention, a handheld terminal is described which doesn't have a concept of the top and bottom like the third embodiment.

Figure 18:
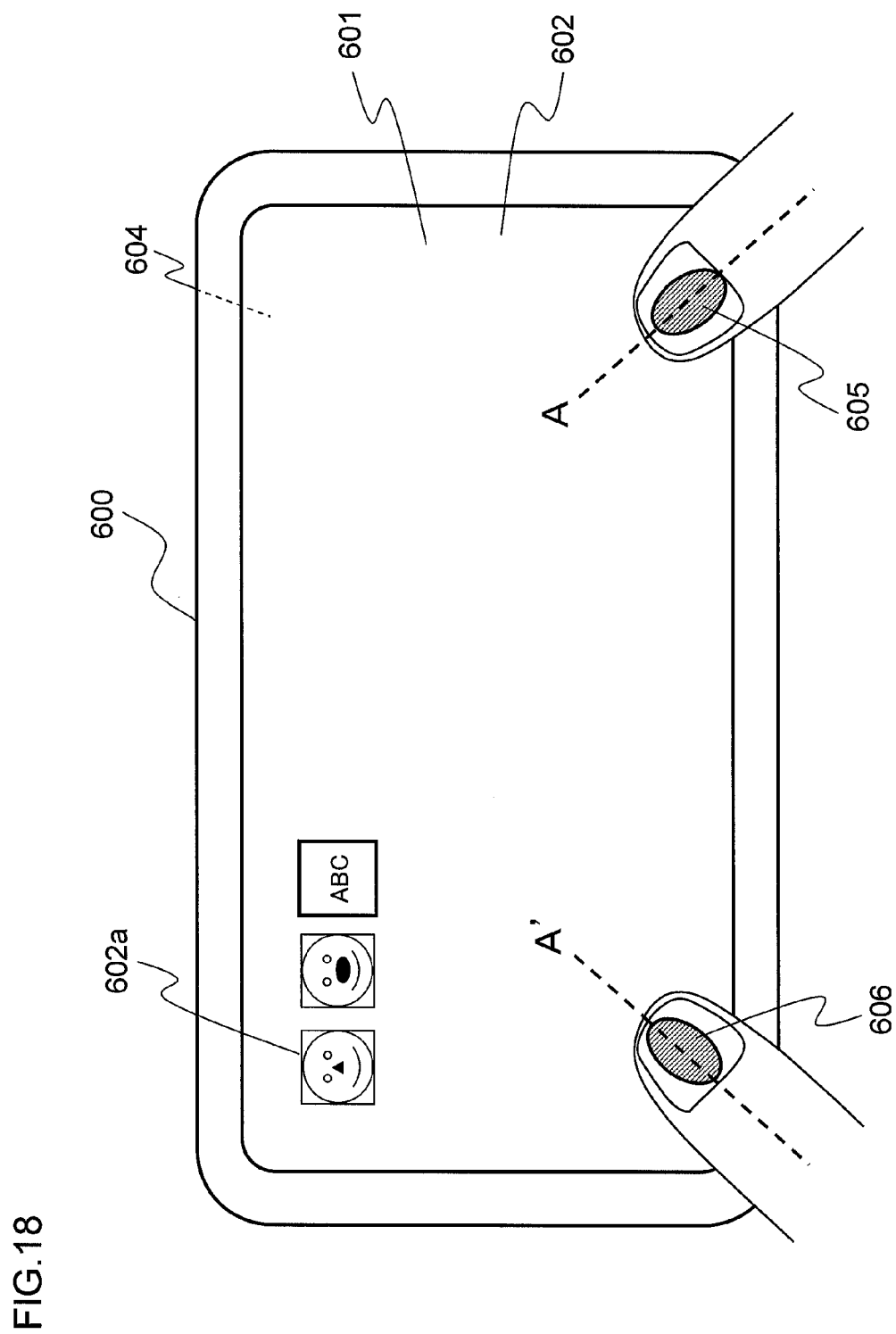
FIG. 18 is an illustration which shows a scene of a handheld terminal held with both hands according to a fourth embodiment of the present invention.

FIG. 18 is an illustration to show a scene of a handheld terminal held with both hands according to the fourth embodiment. The handheld terminal 600 of the fourth embodiment is a handheld terminal such as a tablet-type terminal or a terminal for reading. The handheld terminal 600 of the fourth embodiment doesn't have an acceleration sensor and differs from the handheld terminal 500 of the third embodiment on this point.

Figure 19:
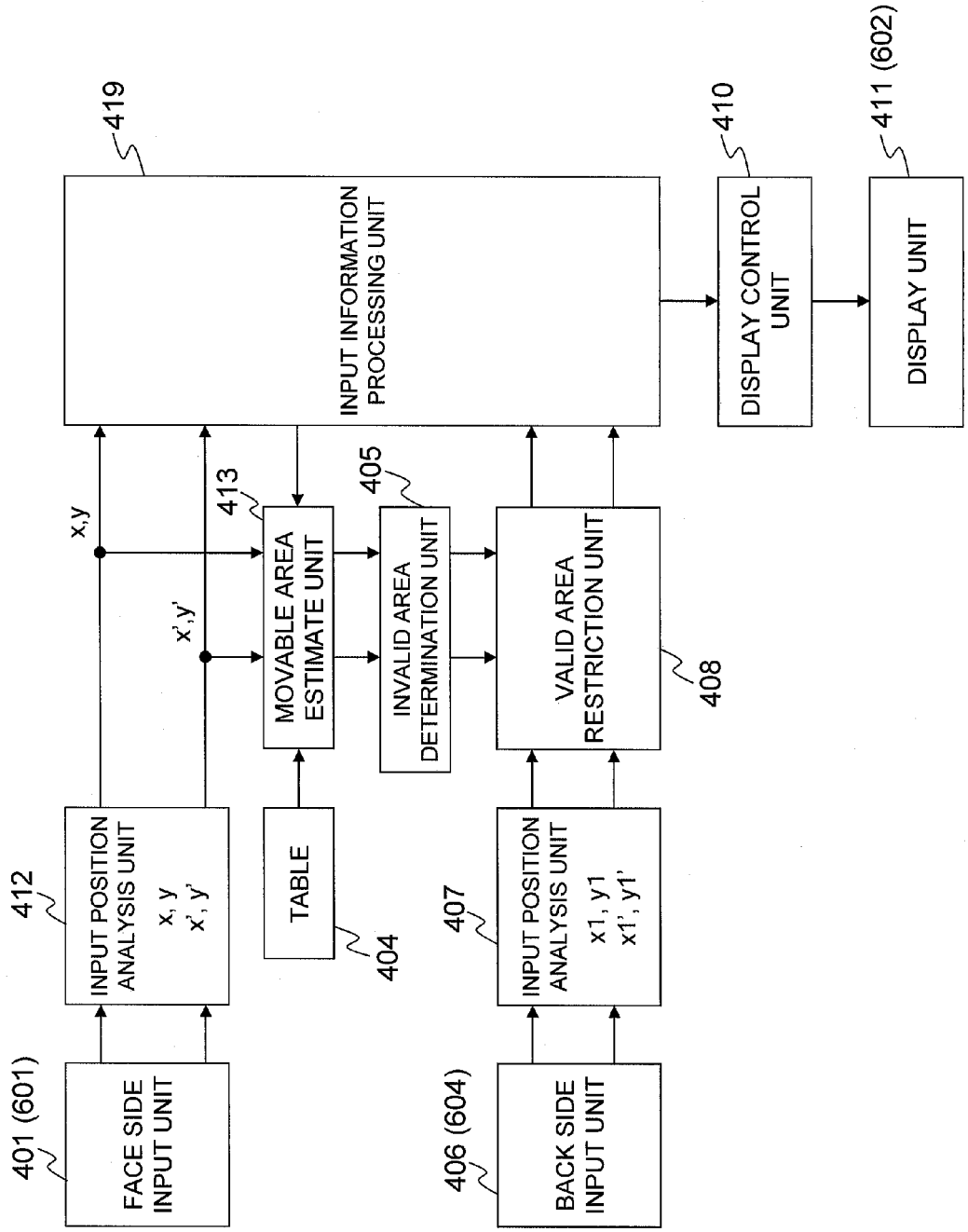
FIG. 19 is a block diagram of the handheld terminal according to the fourth embodiment of the present invention.

A block diagram of the handheld terminal 600 of the fourth embodiment is shown in FIG. 19. The same components as those of the handheld terminal 200 of the second embodiment shown in FIG. 11 are indicated by the same reference numerals.

A face side input unit 401 in FIG. 19 corresponds to the touch panel 601 in FIG. 18. A back side input unit 406 in FIG. 19 corresponds to the touchpad 604 in FIG. 18. A display unit 411 in FIG. 19 corresponds to the liquid crystal display 602 in FIG. 18.

Like the handheld terminal 200 of the second embodiment and the handheld terminal 500 of the third embodiment, the handheld terminal 600 has a capacitive-type touch panel 601 in the face side input unit 401. Therefore, areas of the touch panel 601, which the thumbs of both hands are touching or nearing, can be detected. These areas are named detection areas 605 and 606. Each of the shapes of the detection areas 605 and 606 is oval (two places in FIG. 18) and is shown by filling the oval with oblique lines in FIG. 18.

Same as the handheld terminal 200 of the second embodiment, a touchpad 604 which occupies most of the back side is arranged on the back side of the handheld terminal 600.

As shown in FIG. 18, the shape of each of the detection areas 605 and 606 where the thumbs of both hands touch or near the touch panel 601 is oval. Then, the directions A and A' of the major axes of the detection areas 605 and 606 can be calculated respectively. The direction of the major axis of the oval detection area 605 where the thumb of the right hand touches or nears the touch panel 601 is denoted by A. The direction of the major axis of the oval detection area 606 where the thumb of the left hand touches or nears the touch panel 601 is denoted by A'.

An input position analysis unit 412 of the fourth embodiment notifies an input information processing unit 419 of information about the detection areas 605 and 606 which are detected in the face side input unit 401. The input information processing unit 419 calculates the directions A and A' of the major axes of the oval detection areas 605 and 606 where the thumbs of both hands touch or near the touch panel 601 according to the notified information about the detection areas 605 and 606.

The input information processing unit 419 judges the direction of the handheld terminal 600 according to the directions A and A' of the major axes of the oval detection areas where the thumbs of both hands touch or near the touch panel 601. The input information processing unit 419 judges that the upward direction is a direction such that the directions A and A' approach each other. And the input information processing unit 419 judges that the downward direction is a direction such that the directions A and A' separate from each other.

In this way, the direction of the handheld terminal 600 which is held can be judged.

A movable area estimate unit 413 acquires, from the input information processing unit 419, information indicating the direction of the handheld terminal 600. The movable area estimate unit 413 refers to the correspondence, which is recorded in the table 404, between the position coordinate of the thumb of the right hand and the movable area of the forefinger of the right hand, and refers to the correspondence, which is recorded in the table 404, between the position coordinate of the thumb of the left hand and the movable area of the forefinger of the left hand. Then the movable area estimate unit 413 can estimate the movable areas of the forefingers of both hands of the user.

In this way, the movable area of the forefingers of both hands of the user can be estimated appropriately. Then, the invalid area determination unit 405 can determine the invalid area appropriately with respect to the touchpad 604 in the back side input unit 406.

In this way, it is possible to reduce the problem that a pointing with the forefingers can't be done as intended because each of the middle fingers, the third fingers and the little fingers of both hands of the user touch the back side input unit 406. Moreover, a direction of an icon 602*a* which is displayed on the display unit 411 can be changed appropriately because the direction of the handheld terminal 600 can be judged.

The shape of the face side input unit 401 may be different from a shape of the display unit 411.

Figure 20:
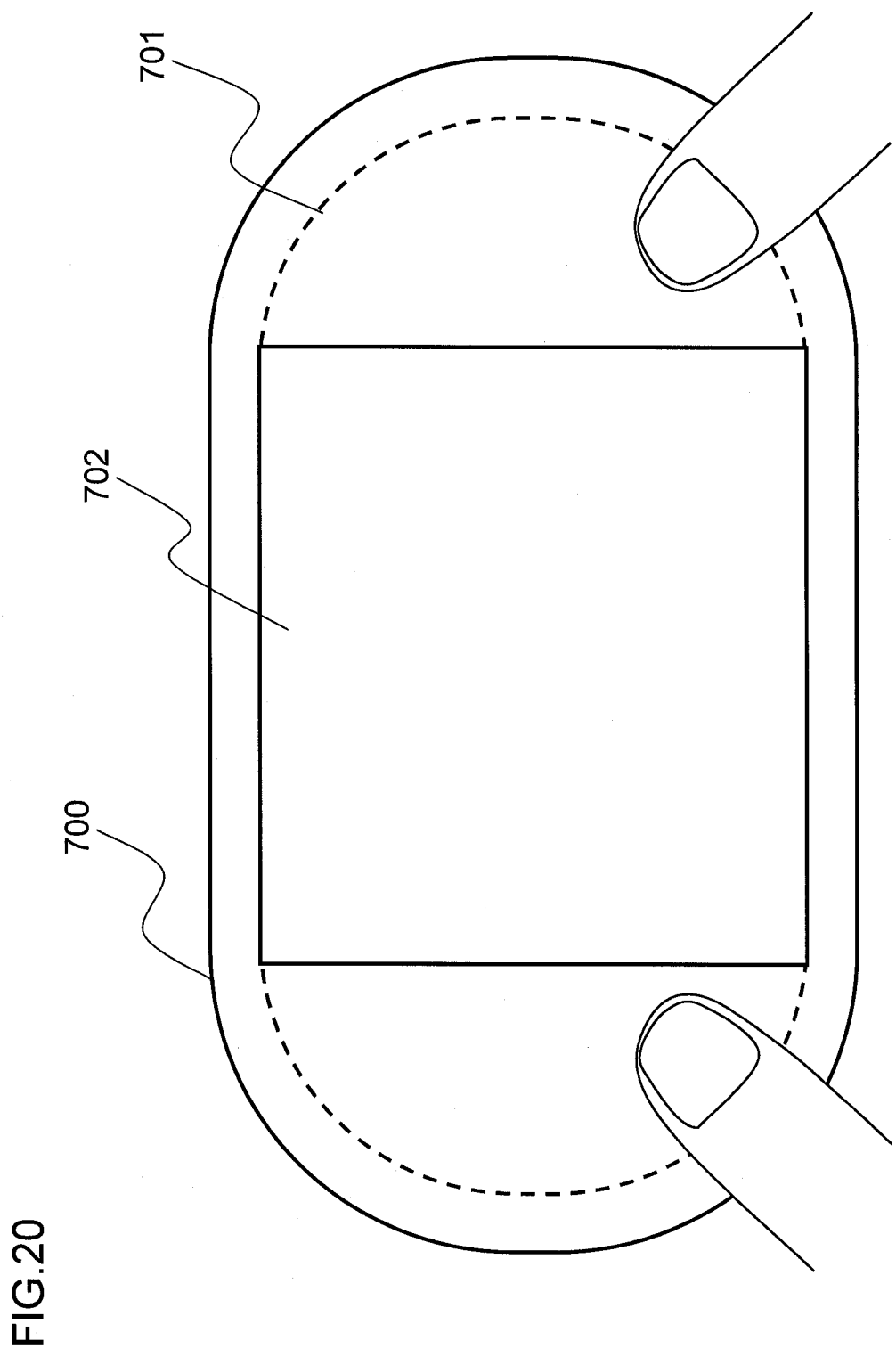
FIG. 20 is an illustration which shows a scene of another handheld terminal having different constitution, held with both hands, according to the fourth embodiment of the present invention.

FIG. 20 is an illustration to show a scene of another handheld terminal 700 having different constitution, held with both hands, according to the fourth embodiment.

Right and left of the handheld terminal 700 are arc-shaped. The face side input unit 401 is placed in an approximately full domain of the surface of the handheld terminal 700. In FIG. 20, the face side input unit 401 is shown as the elliptical of broken line. On the other hand, the display unit 411 is arranged near the central part of the handheld terminal 700. In FIG. 20, the display unit 411 is shown by the rectangle of the solid line.

This invention can be applied to the handheld terminal 700 which is constituted as shown in FIG. 20.

The non-transitory computer-readable medium of the present invention is a recording medium having recorded thereon a program of the above-described input method of the present invention and is a recording medium, the program of which, when read, is used in cooperation with the computer.

The computer according to the present invention explained above is not limited to pure hardware such as a CPU and may include firmware, an OS, and peripheral equipment.

The input device and the input method according to the present invention have an effect that input operation on an input unit arranged on the back side can be executed more correctly in the input device provided input units on both sides. Then the input device and the input method according to the present invention are useful as a smartphone, a tablet-type terminal, a terminal for reading, a portable game player and the like having input units on both the face and back sides.

What is claimed is:

1. An input device comprising:
a device body;
a first touch type position detector which detects a first touch position of a human body on a first detection surface of the device body, the first detection surface being a surface with which images are displayed so as to be viewable;
a second touch type position detector which detects a second touch position of the human body on a second detection surface of the device body, the second detection surface being on an opposite side of the device body from the first detection surface;
an input processor which receives information of the detected second touch position; and
a detection area restrictor which determines a restricted area on the second detection surface according to information of the first touch position and information determined in advance, and which prevents information of any touch position of the human body within the restricted area from being received by the input processor, wherein
the information determined in advance comprises data indicating a relation between the first touch position on the first detection surface and the restricted area on the second detection surface,
the information determined in advance comprises an average value of data of a plurality of persons, each of the data of the persons being a relation between an operation area and a certain position,
the operation area is acquired based on a touch position of a forefinger or a middle finger on the second detection surface when a thumb is touched on at least one position of the first detection surface in a case that the device body is held with the thumb and the forefinger or the middle finger, and
the certain position is the one position of the first detection surface.

2. The input device according to claim 1, wherein the detection area restrictor prevents the information of any touch position of the human body within the restricted area from being received by the input processor by preventing any touch position of the human body within the restricted area from being detected by the second touch type position detector.

3. The input device according to claim 1, wherein
the first touch type position detector detects at least two of the first touch positions on the first detection surface at the same time,
the detection area restrictor determines the restricted area based on one of the first touch positions, and the detection area restrictor determines an additional restricted area on the second detection surface, such that information of any touch position of the human body within the additional restricted area is not received by the input processor, based on another of the first touch positions.

4. The input device according to claim 1, further comprising an acceleration sensor, wherein
the first touch type position detector detects a touch area of the human body on the first detection surface and determines the first touch position based on the detected touch area,
the information determined in advance comprises a plurality of pieces of information determined in advance depending on a direction in which the device body is held, and
the detection area restrictor selects one of the pieces of information determined in advance based on a holding direction of the device body, the holding direction being determined by a direction of the touch area detected by the first touch type position detector and a direction of gravity detected by the acceleration sensor, and
the detection area restrictor determines the restricted area according to the selected piece of information determined in advance.

5. The input device according to claim 1, further comprising:
a display screen with a surface being the first detection surface; and
a display controller which controls the display screen, wherein
the first touch type position detector detects a touch area of the human body on the first detection surface and determines the first touch position based on the detected touch area,
the first touch type position detector detects two of the touch areas on the first detection surface, and
the display controller changes a direction of screen components displayed on the display screen based on each of a direction of the two touch areas detected by the first touch type position detector.

6. An input method comprising:
detecting a first touch position of a human body on a first detection surface of a device body, the first detection surface being a surface with which images are displayed so as to be viewable;
detecting a second touch position of the human body on a second detection surface that is on an opposite side of the device body from the first detection surface;
determining a restricted area on the second detection surface of the device body, according to information of the first touch position and information determined in advance;
sending to an input processor information of the detected second touch position;
preventing the input processor from receiving information of any touch position of the human body within the restricted area of the second detection surface; and
determining an average value of data of a plurality of persons, each of the data of the persons being a relation between an operation area and a certain position, wherein
the information determined in advance is data indicating a relation between the first touch position on the first detection surface and the restricted area on the second detection surface,
the operation area is acquired based on a touch position of a forefinger or a middle finger on the second detection surface when a thumb is touched on at least one position of the first detection surface in a case that the device body is held with the thumb and the forefinger or the middle finger,
the certain position is the one position of the first detection surface, and
the information determined in advance comprises the average value of data of the plurality of persons.

7. A non-transitory computer-readable medium having a program stored thereon, the program causing a computer to execute the input method according to claim 6.

8. The input method according to claim 6, wherein the preventing of the input processor from receiving information of any touch position of the human body within the restricted area of the second detection surface comprises preventing any touch position of the human body within the restricted area from being detected by the second touch type position detector.

9. The input device according to claim 1, wherein
the device body is flat-shaped,
the first detection surface is on a face side of the device body, and
the second detection surface is on a back side of the device body.

10. The input device according to claim 9, wherein the face side of the device body comprises a display screen with a surface being the first detection surface.

11. The input method according to claim 6, wherein
the device body is flat-shaped,
the first detection surface is on a face side of the device body, and
the second detection surface is on a back side of the device body.

12. The input method according to claim 11, wherein the face side of the device body comprises a display screen with a surface being the first detection surface.

13. The input device according to claim 1, wherein:
the second touch type position detector outputs the information of any touch position of the human body in the restricted area to the detection area restrictor, and
the detection area restrictor prevents the information of any touch position of the human body within the restricted area from being received by the input processor by not outputting the information of any touch position of the human body in the restricted area to the input processor.

14. The input method according to claim 6, further comprising sending to the detection area restrictor the information of any touch position of the human body in the restricted area,
wherein the preventing of the input processor from receiving information of any touch position of the human body within the restricted area of the second detection surface comprises preventing the detection area restrictor from outputting the information of any touch position of the human body in the restricted area to the input processor.

15. The input device according to claim 1, wherein the input processor also receives information of the detected first touch position.

16. The input method according to claim 6, further comprising sending to the input processor information of the detected first touch position.

17. The input device according to claim 1, wherein the detection area restrictor determines the restricted area also according to a history of previous second touch positions on the second detection surface.

18. The input method according to claim 6, wherein the restricted area is determined also according to a history of previous second touch positions on the second detection surface.

* * * * *